US012684183B2

(12) United States Patent
　Orlowski

(10) Patent No.: US 12,684,183 B2
(45) Date of Patent: *Jul. 14, 2026

(54) MEASURING VIDEO-CONTENT VIEWING

(71) Applicant: Comcast Cable Communications, LLC, Philadelphia, PA (US)

(72) Inventor: Robert Alan Orlowski, Centennial, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/912,087

(22) Filed: Oct. 10, 2024

(65) Prior Publication Data

US 2025/0039483 A1　Jan. 30, 2025

Related U.S. Application Data

(63) Continuation of application No. 18/135,565, filed on Apr. 17, 2023, now Pat. No. 12,155,875, which is a continuation of application No. 17/533,375, filed on Nov. 23, 2021, now Pat. No. 11,677,998, which is a continuation of application No. 17/229,357, filed on Apr. 13, 2021, now Pat. No. 11,212,565, which is a continuation of application No. 16/730,423, filed on Dec. 30, 2019, now Pat. No. 11,012,726, which is a continuation of application No. 14/013,031, filed on Aug. 29, 2013, now Pat. No. 10,645,433.

(51) Int. Cl.
　*H04N 21/24* (2011.01)
　*H04N 21/442* (2011.01)

(52) U.S. Cl.
　CPC ... *H04N 21/2407* (2013.01); *H04N 21/44226* (2020.08)

(58) Field of Classification Search
　None
　See application file for complete search history.

(56) References Cited

U.S. PATENT DOCUMENTS

| | | |
|---|---|---|
| 5,374,951 A | 12/1994 | Welsh |
| 5,589,892 A | 12/1996 | Knee et al. |
| | (Continued) | |

FOREIGN PATENT DOCUMENTS

| | | |
|---|---|---|
| CN | 102236867 A | 11/2011 |
| EP | 1995878 A2 | 11/2008 |
| | (Continued) | |

OTHER PUBLICATIONS

Cisco Systems, Inc., "Channel Viewership Analyzer", 2009, Web page: http://www.cisco.com/en/US/prod/collateral/video/ps9119/ps9883/7016867.pdf, pp. 1-2.

(Continued)

*Primary Examiner* — Fernando Alcon
(74) *Attorney, Agent, or Firm* — Banner & Witcoff, Ltd.

(57) ABSTRACT

A computer-implemented method of using video program viewer interaction data to calculate viewing activity, including second-by-second viewing metrics, associated with a video asset. The calculated metrics provide detailed information on customer viewing behavior which can be used to drive business decisions for service providers, advertisers and content producers.

41 Claims, 20 Drawing Sheets

(56)　　　　　References Cited

U.S. PATENT DOCUMENTS

| | | | |
|---|---|---|---|
| 5,790,935 | A | 8/1998 | Payton |
| 5,872,588 | A | 2/1999 | Aras et al. |
| 6,286,005 | B1 | 9/2001 | Cannon |
| 6,449,350 | B1 | 9/2002 | Cox |
| 6,820,277 | B1 | 11/2004 | Eldering et al. |
| 7,260,823 | B2 | 8/2007 | Schlack et al. |
| 7,383,243 | B2 | 6/2008 | Conkwright et al. |
| 7,490,045 | B1 | 2/2009 | Flores et al. |
| 7,509,663 | B2 | 3/2009 | Maynard et al. |
| 7,590,993 | B1 | 9/2009 | Hendricks et al. |
| 7,614,064 | B2 | 11/2009 | Zigmond |
| 7,729,940 | B2 | 6/2010 | Harvey et al. |
| 7,930,391 | B1 | 4/2011 | Holt |
| 8,001,561 | B2 | 8/2011 | Gibbs et al. |
| 8,079,054 | B1 | 12/2011 | Dhawan et al. |
| 8,108,886 | B1 | 1/2012 | Murahashi et al. |
| 8,214,867 | B2 | 7/2012 | Hudspeth |
| 8,280,996 | B2 | 10/2012 | Lu et al. |
| 8,351,645 | B2 | 1/2013 | Srinivasan |
| 8,352,984 | B2 | 1/2013 | Gogoi et al. |
| 8,365,212 | B1 | 1/2013 | Orlowski |
| 8,365,213 | B1 | 1/2013 | Orlowski |
| 8,453,173 | B1 | 5/2013 | Anderson et al. |
| 8,548,991 | B1 | 10/2013 | Zamir et al. |
| 8,682,137 | B2 | 3/2014 | Wright et al. |
| 8,694,396 | B1 | 4/2014 | Craner et al. |
| 8,739,197 | B1 | 5/2014 | Pecjak et al. |
| 8,745,647 | B1 | 6/2014 | Shin et al. |
| 8,924,993 | B1 | 12/2014 | Niebles Duque et al. |
| 8,949,873 | B1 | 2/2015 | Bayer et al. |
| 8,959,540 | B1 | 2/2015 | Gargi et al. |
| 9,277,275 | B1 | 3/2016 | Arini |
| 9,363,464 | B2 | 6/2016 | Alexander |
| 9,420,320 | B2 | 8/2016 | Doe |
| 9,794,360 | B1 | 10/2017 | Farhangi et al. |
| 9,854,292 | B1 | 12/2017 | Matthews et al. |
| 9,883,233 | B1 | 1/2018 | Barton |
| 10,070,177 | B1 | 9/2018 | Gupta |
| 10,645,433 | B1 | 5/2020 | Orlowski |
| 10,779,042 | B1 | 9/2020 | Gupta et al. |
| 11,240,539 | B1 | 2/2022 | Joshi et al. |
| 11,265,602 | B2 | 3/2022 | Malhotra et al. |
| 2002/0055854 | A1 | 5/2002 | Kurauchi et al. |
| 2002/0056087 | A1 | 5/2002 | Berezowski et al. |
| 2002/0059576 | A1 | 5/2002 | Feininger et al. |
| 2002/0062393 | A1 | 5/2002 | Borger et al. |
| 2002/0083451 | A1 | 6/2002 | Gill et al. |
| 2002/0087980 | A1 | 7/2002 | Eldering et al. |
| 2002/0097984 | A1 | 7/2002 | Abecassis |
| 2002/0104083 | A1 | 8/2002 | Hendricks et al. |
| 2002/0129368 | A1 | 9/2002 | Schlack et al. |
| 2002/0144262 | A1 | 10/2002 | Plotnick et al. |
| 2002/0194196 | A1 | 12/2002 | Weinberg et al. |
| 2002/0199193 | A1 | 12/2002 | Gogoi et al. |
| 2003/0020744 | A1 | 1/2003 | Ellis et al. |
| 2003/0046696 | A1 | 3/2003 | Mizuno et al. |
| 2003/0088715 | A1 | 5/2003 | Chaudhuri et al. |
| 2003/0110491 | A1 | 6/2003 | Rodriguez et al. |
| 2003/0115585 | A1 | 6/2003 | Barsness et al. |
| 2003/0145323 | A1 | 7/2003 | Hendricks et al. |
| 2003/0149988 | A1 | 8/2003 | Ellis et al. |
| 2003/0172374 | A1 | 9/2003 | Vinson et al. |
| 2003/0174160 | A1 | 9/2003 | Deutscher et al. |
| 2003/0237095 | A1 | 12/2003 | Srinivas |
| 2004/0019899 | A1 | 1/2004 | Pelletier |
| 2004/0215698 | A1 | 10/2004 | Bertin |
| 2004/0268226 | A1 | 12/2004 | McMullin |
| 2005/0060745 | A1 | 3/2005 | Riedl et al. |
| 2005/0086110 | A1 | 4/2005 | Haley et al. |
| 2005/0149964 | A1 | 7/2005 | Thomas et al. |
| 2005/0204387 | A1 | 9/2005 | Knudson et al. |
| 2005/0229199 | A1 | 10/2005 | Yabe |
| 2005/0235307 | A1 | 10/2005 | Relan et al. |
| 2005/0286860 | A1 | 12/2005 | Conklin |
| 2006/0015891 | A1 | 1/2006 | Lazzaro et al. |
| 2006/0059042 | A1 | 3/2006 | Zohar |
| 2006/0075420 | A1 | 4/2006 | Ludvig et al. |
| 2006/0075421 | A1 | 4/2006 | Roberts et al. |
| 2006/0168609 | A1 | 7/2006 | Chen |
| 2006/0184961 | A1 | 8/2006 | Lee et al. |
| 2006/0198302 | A1 | 9/2006 | Sofman et al. |
| 2006/0212409 | A1* | 9/2006 | Steelberg ........... H04N 21/2407 |
| | | | 348/E7.054 |
| 2006/0223495 | A1 | 10/2006 | Cassett et al. |
| 2007/0067794 | A1 | 3/2007 | Russell et al. |
| 2007/0074258 | A1* | 3/2007 | Wood ................... H04N 21/438 |
| | | | 725/105 |
| 2007/0092204 | A1 | 4/2007 | Wagner et al. |
| 2007/0124756 | A1 | 5/2007 | Covell et al. |
| 2007/0136753 | A1 | 6/2007 | Bovenschulte et al. |
| 2007/0157249 | A1 | 7/2007 | Cordray et al. |
| 2007/0157260 | A1 | 7/2007 | Walker |
| 2007/0186228 | A1 | 8/2007 | Ramaswamy et al. |
| 2007/0214483 | A1 | 9/2007 | Bou-Abboud |
| 2007/0271300 | A1 | 11/2007 | Ramaswamy |
| 2007/0283409 | A1 | 12/2007 | Golden |
| 2007/0288950 | A1 | 12/2007 | Downey et al. |
| 2008/0022300 | A1 | 1/2008 | Angiolillo et al. |
| 2008/0046912 | A1 | 2/2008 | Gemelos et al. |
| 2008/0077951 | A1 | 3/2008 | Maggio et al. |
| 2008/0126420 | A1 | 5/2008 | Wright et al. |
| 2008/0127252 | A1 | 5/2008 | Eldering et al. |
| 2008/0250453 | A1 | 10/2008 | Smith et al. |
| 2008/0300965 | A1 | 12/2008 | Doe |
| 2009/0007171 | A1 | 1/2009 | Casey et al. |
| 2009/0046994 | A1 | 2/2009 | Takesue et al. |
| 2009/0052864 | A1 | 2/2009 | Ohde |
| 2009/0070798 | A1 | 3/2009 | Lee et al. |
| 2009/0077577 | A1 | 3/2009 | Allegrezza et al. |
| 2009/0077579 | A1 | 3/2009 | Li et al. |
| 2009/0094630 | A1 | 4/2009 | Brown |
| 2009/0100456 | A1 | 4/2009 | Hughes |
| 2009/0133047 | A1 | 5/2009 | Lee et al. |
| 2009/0133073 | A1 | 5/2009 | DaLaCruz et al. |
| 2009/0150224 | A1 | 6/2009 | Lu et al. |
| 2009/0150814 | A1 | 6/2009 | Eyer et al. |
| 2009/0172725 | A1 | 7/2009 | Heilbron et al. |
| 2009/0183210 | A1 | 7/2009 | Andrade |
| 2009/0187932 | A1* | 7/2009 | Rathburn ........... G06Q 30/0246 |
| | | | 725/9 |
| 2009/0193460 | A1 | 7/2009 | Barnett |
| 2009/0268905 | A1 | 10/2009 | Matsushima et al. |
| 2009/0313232 | A1 | 12/2009 | Tinsley et al. |
| 2009/0327208 | A1 | 12/2009 | Bittner et al. |
| 2010/0043021 | A1 | 2/2010 | Torsiello et al. |
| 2010/0088716 | A1 | 4/2010 | Ellanti et al. |
| 2010/0115060 | A1 | 5/2010 | Julia et al. |
| 2010/0145791 | A1 | 6/2010 | Canning et al. |
| 2010/0161492 | A1 | 6/2010 | Harvey et al. |
| 2010/0169911 | A1 | 7/2010 | Zhang |
| 2010/0191689 | A1 | 7/2010 | Cortes et al. |
| 2010/0205641 | A1 | 8/2010 | Charania et al. |
| 2010/0211439 | A1 | 8/2010 | Marci et al. |
| 2010/0235852 | A1 | 9/2010 | Mears |
| 2010/0251302 | A1 | 9/2010 | Chao et al. |
| 2010/0262986 | A1 | 10/2010 | Adimatyam et al. |
| 2010/0330954 | A1 | 12/2010 | Manning Cassett et al. |
| 2011/0029666 | A1 | 2/2011 | Lopatecki et al. |
| 2011/0069940 | A1 | 3/2011 | Shimy et al. |
| 2011/0072448 | A1 | 3/2011 | Stiers et al. |
| 2011/0078572 | A1 | 3/2011 | Milazzo |
| 2011/0110515 | A1* | 5/2011 | Tidwell ................ H04N 21/812 |
| | | | 380/200 |
| 2011/0126241 | A1 | 5/2011 | Beattie, Jr. et al. |
| 2011/0145847 | A1 | 6/2011 | Barve et al. |
| 2011/0289524 | A1 | 11/2011 | Toner et al. |
| 2011/0307913 | A1 | 12/2011 | Wang et al. |
| 2011/0321077 | A1 | 12/2011 | Wang et al. |
| 2012/0005527 | A1 | 1/2012 | Engel et al. |
| 2012/0079518 | A1 | 3/2012 | Wan et al. |
| 2012/0137324 | A1 | 5/2012 | E et al. |
| 2012/0151511 | A1 | 6/2012 | Bernard et al. |
| 2012/0191815 | A1 | 7/2012 | Tabbal et al. |
| 2012/0222058 | A1 | 8/2012 | el Kaliouby et al. |

(56) References Cited

U.S. PATENT DOCUMENTS

| | | | |
|---|---|---|---|
| 2012/0240143 A1 | 9/2012 | Mathews | |
| 2012/0254911 A1 | 10/2012 | Doe | |
| 2012/0260278 A1 | 10/2012 | Lambert et al. | |
| 2012/0278161 A1 | 11/2012 | Lazzaro | |
| 2012/0278179 A1 | 11/2012 | Campbell et al. | |
| 2012/0278828 A1 | 11/2012 | Yazdani et al. | |
| 2012/0296909 A1 | 11/2012 | Cao et al. | |
| 2012/0304210 A1 | 11/2012 | Zaslavsky et al. | |
| 2012/0304211 A1 | 11/2012 | Berezowski et al. | |
| 2012/0311635 A1 | 12/2012 | Mushkatblat | |
| 2013/0007789 A1 | 1/2013 | Wang et al. | |
| 2013/0024901 A1 | 1/2013 | Sharif-Ahmadi et al. | |
| 2013/0124309 A1 | 5/2013 | Traasdahl et al. | |
| 2013/0139194 A1 | 5/2013 | Carini | |
| 2013/0145385 A1 | 6/2013 | Aghajanyan et al. | |
| 2013/0173765 A1 | 7/2013 | Korbecki | |
| 2013/0198125 A1 | 8/2013 | Oliver et al. | |
| 2013/0247081 A1 | 9/2013 | Vinson et al. | |
| 2013/0254787 A1 | 9/2013 | Cox et al. | |
| 2013/0283304 A1 | 10/2013 | Wan et al. | |
| 2013/0346154 A1 | 12/2013 | Holz et al. | |
| 2014/0013345 A1* | 1/2014 | Vinson | H04H 60/31 |
| | | | 725/14 |
| 2014/0068692 A1 | 3/2014 | Archibong et al. | |
| 2014/0075465 A1 | 3/2014 | Petrovic et al. | |
| 2014/0109124 A1 | 4/2014 | Morales et al. | |
| 2014/0123173 A1 | 5/2014 | Mak et al. | |
| 2014/0150005 A1 | 5/2014 | Kalmes et al. | |
| 2014/0181019 A1 | 6/2014 | Bajaria et al. | |
| 2014/0201768 A1* | 7/2014 | You | H04N 21/24 |
| | | | 725/14 |
| 2014/0351835 A1 | 11/2014 | Orlowski | |
| 2014/0359649 A1 | 12/2014 | Cronk et al. | |
| 2015/0113153 A1 | 4/2015 | Lin | |
| 2015/0128162 A1 | 5/2015 | Ionescu | |
| 2015/0163558 A1 | 6/2015 | Wheatley | |
| 2016/0261655 A1 | 9/2016 | Aggarwal et al. | |
| 2016/0314404 A1 | 10/2016 | Carmichael et al. | |
| 2017/0289226 A1 | 10/2017 | Deshpande et al. | |
| 2018/0007431 A1 | 1/2018 | Sidhu et al. | |
| 2018/0288460 A1 | 10/2018 | Thomas et al. | |
| 2019/0058917 A1 | 2/2019 | Orlowski | |
| 2019/0305978 A1 | 10/2019 | Ramirez et al. | |
| 2019/0378164 A1 | 12/2019 | Eich et al. | |
| 2019/0379938 A1 | 12/2019 | Salo et al. | |
| 2020/0014970 A1* | 1/2020 | Barton | H04N 21/435 |
| 2020/0162774 A1* | 5/2020 | Galuten | H04N 21/25891 |
| 2020/0296456 A1 | 9/2020 | Yungster | |
| 2021/0058670 A1 | 2/2021 | Benamrouche | |
| 2021/0158391 A1 | 5/2021 | Sheppard et al. | |
| 2021/0240681 A1 | 8/2021 | Algranati et al. | |
| 2022/0084052 A1 | 3/2022 | Sheppard et al. | |
| 2022/0150581 A1 | 5/2022 | Sidhu et al. | |
| 2022/0159326 A1 | 5/2022 | Sheppard et al. | |
| 2022/0182722 A1 | 6/2022 | Bolivar et al. | |
| 2022/0256219 A1 | 8/2022 | Saafi | |
| 2022/0286722 A1 | 9/2022 | Milavsky et al. | |
| 2022/0303618 A1 | 9/2022 | Whitely et al. | |
| 2022/0383350 A1 | 12/2022 | Keshavan et al. | |
| 2024/0121457 A1* | 4/2024 | Kazemi Rad | H04N 21/44204 |

FOREIGN PATENT DOCUMENTS

| | | | |
|---|---|---|---|
| WO | 98/31114 A1 | 7/1998 | |
| WO | 2012162693 A1 | 11/2012 | |
| WO | 2013033123 A2 | 3/2013 | |

OTHER PUBLICATIONS

Ineoquest Technologies, Inc., "Switched Digital Video Solutions", http://www.ineoquest.com/switched-digital-video-solutions, Dec. 28, 2010, pp. 1-2.

Motorola, Inc., Solutions Paper, "Implementing Switched Digital Video Solutions", http://www.motorola.com/staticfiles/Business/Products/_Documents/_Static%20files/SDV%20Implementation%20Solutions%20paper%20-555998-001-a.pdf?localeId=33, Copyright 2008, p. 6.

Strickland, Jonathan, "How Switched Digital Video Works", Nov. 20, 2007. HowStuffWorks.com. <http://electronics.howstuffworks.com/switched-digital-video.htm>, pp. 1-4.

Rentrak Corporation, Television, TV Essentials, Web source: http://www.rentrak.com/section/media/tv/linear.html, Feb. 1, 2011, p. 1.

Wayne Friedman, Rentrak's 'Stickiness' Mines TV Value on Granular Level , MediaPost, Jan. 27, 2010, Web source: http://www.tvb.org/media/file/TVB_Measurement_Rentraks_Stickiness_Mines_TV_Value_on_Granular_Level_1-27-10.pdf.

Rentrak Corporation, Reaching Your Target Audience Using Viewership Segments, Rentrak Case Studies, http://rentrak.com/downloads/Viewership_Segment_Case_Study.pdf, Oct. 18, 2013, p. 1-2.

Rentrak Corporation, Reaching Your Target Audience Using Commercial Ratings and Pod Analysis, Rentrak Case Studies, http://www.rentrak.com/downloads/Commercial_and_Pod_Analysis_Case_Study.pdf, Oct. 18, 2013, p. 1-2.

Rentrak Corporation, Rentrak Overview: Exact Commercial Ratings®, http://www.rentrak.com/downloads/Exact_Commercial_Ratings_Presentation.pdf, Jan. 22, 2013, p. 1-30.

Tim Brooks, Stu Gray, Jim Dennison, "The State of Set-Top Box Viewing Data as of Dec. 2009", STB Committee of the Council for Research Excellence. Research Report, Feb. 24, 2010, http://researchexcellence.com/stbstudy.php, pp. 1-9.

FourthWall Media, Product information from web page, MassiveDataTM, http://www.fourthwallmedia.tv, Oct. 18, 2013, p. 1.

Cisco Systems, Inc., "Network Efficiency with Switched Digital", Web page: http://www.cisco.com/en/US/products/ps9258/index.html, accessed Oct. 13, 2014, 2 pages.

Cisco Systems, Inc., "Access Viewership Data, Monitor Performance", Web page: http://www.cisco.com/en/US/products/ps9122/index.html, accessed May 20, 2013, 1 page.

Extended European Search Report—EP 14183827.6—Mailing date: Oct. 23, 2014.

Extended European Search Report—EP 14182927.5—Mailing date: Dec. 16, 2014.

Terry A. Welch, Sperry Research Center, "A Technique for High-Performance Data Compression," 1984.

Extended European Search Report, EP Application 14186382.9, Dated Feb. Feb. 4, 2015.

Response to European Search Report—EP Appl. 14182927.5—submitted Sep. 4, 2015.

Response to European Search Report—EP 14183827.6—Dated Sep. 10, 2015.

Response to EP Search Report—EP 14186382.9—Dated Sep. 29, 2015.

EP Office Action—EP App 14182927.5—Mailed Mar. 31, 2016.

Konstantin Shvachko et al.: "The Hadoop Distributed File System", Mass Storage Systems and Technologies (MSST), 2010 IEEE 26th Symposium On, IEEE, Piscataway, NJ, USA, May 3, 2010 (May 3, 2010), pp. 1-10, XP031698650, ISBN: 978-1-4244-7152-2.

Anonymous: "Apache Hadoop", Sep. 5, 2013 (Sep. 5, 2013), XP055394634, Retrieved from the Internet: URL: https://en.wikipedia.org/w/index.php?title=Apache_Hadoop&oldid=571641303 [retrieved on Jul. 28, 2017].

Aug. 4, 2017—(EP) Office Action—App No. 14183827.6.

May 22, 2018—European Office Action—EP 14183827.6.

Mark Landler, Digital TV Converter Boxes to Expand Cable Offerings, 1996, The New York Times.

Mar. 22, 2019—EP Office Action—EP 14186382.9.

Nov. 10, 2020—CA Office Action—CA 2,864,621.

Nov. 6, 2020—EP Office Action—EP 14186382.9.

Jan. 12, 2021—Canadian Office Action—CA 2,860,802.

Jan. 13, 2021—Canadian Office Action—CA 2,861,861.

Jun. 23, 2021—Canadian Office Action—CA 2,864,621.

Jun. 22, 2021—European Office Action—EP 14186382.9.

Nov. 3, 2021—Canadian Office Action—CA 2,860,802.

Nov. 5, 2021—Canadian Office Action—CA 2,861,861.

(56)          References Cited

OTHER PUBLICATIONS

Dec. 9, 2021—European Office Action—14186382.9.
Jan. 3, 2023—EP Office Action—EP App. No. 14186382.9.

* cited by examiner

FIG. 3

Summary Information

| Specification Name: | Video Viewing Activity Data File 130 |
|---|---|
| Record description: | The Video Viewing Activity Data contains video viewing activity data from a Media Measurement Data Base or a similar input source.  This video viewing activity data can then be exploded into the individual Video Viewing Detail records which will be processed by the MapReduce Aggregation Engine 200.<br><br>The video viewing activity can be whatever viewing activity the analyst needs to analyze.  Non-limiting examples include: a single video program, a segment of a video program, a commercial, an hour of the viewing day, a primetime television viewing period, an entire 24 hour day of viewing, a week of viewing, or another time period decided by the analyst.<br><br>The analyst may leave one or more of the identifier fields in this record null. This would cause the aggregation process to not create any detail breakouts for that identifier. |

FIG. 3 - Continued
Data Structure

| | NAME | TYPE | SIZE | DESCRIPTION |
|---|---|---|---|---|
| | 1000 | 1002 | 1004 | 1006 |
| | Notes: By putting the Geographic Id in this record, this enables the program to carry the Geographic Id forward to the Video Viewing Detail File for aggregation by any user defined Geographic area. This provides a geographic identifier identifying the location of a video asset viewing device. Notes: By putting the Video Server Id in this record, this enables the program to carry the Video Server Id forward to the Video Viewing Detail File for aggregation by aggregation by Video Server. Notes: By putting the Demographic Id in this record, this enables the program to carry the Demographic Id forward to the Video Viewing Detail File for aggregation by any user defined demographic id. This provides a demographic identifier describing a viewer operating a video asset viewing device. Notes: By putting the Video Content Id in this record, this enables the program to carry the Video Content Id forward to the Video Viewing Detail File for aggregation by any user defined video content grouping such as aggregating by channel call sign, channel source id, video program id, video asset id, and others. Notes: By putting the Tune-in second of the day and the Tune-out second of the day in this record, this enables the execution of algorithms that create one record for each second of the day covered by the tuning event. | | | |
| 1010~ | GEOGRAPHIC_ID | CHAR | 4 | The Geographic Identifier records the geographic area in which the Viewing Activity occurred.<br><br>See Geographic information in the DEFINITIONS section for a description of the kinds of geographic values that may be linked with a viewing activity. |
| 1020~ | VIDEO_SERVER_ID | CHAR | 12 | The Video Server Identifier records the video server or computer system identifier from which the video content was streamed. |
| 1030~ | VIDEO_CONTENT_ID | CHAR | 10 | Video Content Identifier records a value that identifies the video content. This can be: Channel Call Sign, Channel Source Id, Video Program Id, Video Asset Id, or any similar value. |

FIG. 3 - Continued

| | | | | |
|---|---|---|---|---|
| 1040~ | VIDEO_ASSET VIEWING_DEVICE_ID | CHAR | 32 | Video Asset Viewing Device Id records the identifier of the device used to view the video content.  This may be a Set top box id, a MAC address, a Smart phone id, a IP TV ip TV address, or any other similar field. The viewing device may contain a tuner number if the delivery platform has such a value.<br>A Video Asset Viewing Device may be assigned any number of Device Characteristics as described in the DEFINITIONS section.<br>A Video Asset Viewing Device may be assigned a Device Type as described in the DEFINITIONS section.<br>In an alternative embodiment, the Video Asset Viewing Device Id may be populated with a Device Characteristic or a Device Type and then used to aggregate to that value.  As a non-limiting example, aggregate to a Device Type of smart phone. |
| 1050~ | HOUSE_ID | CHAR | 32 | House Id records the house identifier associated with the viewing activity. |
| 1060~ | VIEWER_ID | CHAR | 32 | Viewer Id records the viewer identifier associated with the viewing activity. There may be multiple viewers associated with a house.  This can identify a specific viewer. |
| 1070~ | DEMOGRAPHIC_ID | CHAR | 12 | Demographic Id records a demographic identifier associated with the viewer.  This is used to identify demographic code values for things such as age, income, education, occupation, home value, and viewing interests.<br>See Demographic information in the DEFINITIONS section for a description of the kinds of demographic values that may be assigned to a viewer. |

FIG. 3 - Continued

| | | | | |
|---|---|---|---|---|
| 1080~ | TUNE_IN_DATE_TIME | DATE TIME | | Tune in date time records the tune in date and time of the viewing activity.<br>This can also be represented as the UNIX epoch time which is the number of seconds since Jan 1, 1970. |
| 1090~ | TUNE_IN_SECOND_OF_DAY | Number | 5 | Tune In Second of Day records time of the tune in represented as seconds past midnight. This value is used as the beginning point in a looping process which creates one record for every second of the tune duration.<br>In an alternative embodiment, the Tune In Second of Day may be replaced with a video frame number visible at time of tune-in. |
| 1100~ | TUNE_OUT_DATE_TIME | DATE TIME | | Tune out date and time records the tune out date and time of the viewing activity.<br>This can also be represented as the UNIX epoch time which is the number of seconds since Jan 1, 1970. |
| 1110~ | TUNE_OUT_SECOND_OF_DAY | Number | 5 | Tune out Second of Day records time of the tune out represented as seconds past midnight. This value is used as the ending point in a looping process which creates one record for every second of the tune duration.<br>In an alternative embodiment, the Tune Out Second of Day may be replaced with a video frame number visible at time of tune-out. |
| 1120~ | TUNE_DURATION_SECONDS | Number | 5 | Tune Duration Seconds provides an alternative way to control the looping process which creates one record for every second of the tune duration. It is used to loop 'Tune Duration Seconds' times beginning with the Tune In Second of the Day.<br>Tune Duration includes the beginning and ending seconds of the tune event. |

FIG. 3 - Continued
Sample Data
Note: Field references are shown below field names.

| GEO ID 1010 | VIDEO SERVER 1020 | VIDEO CONTENT 1030 | VIEW-ING DEVICE 1040 | HOUSE 1050 | VIEWER 1060 | DEMO CODE 1070 | TUNE-IN DATE TIME 1080 | TUNE-IN SECOND 1090 | TUNE-OUT DATE TIME 1100 | TUNE-OUT SECOND 1110 | TUNE DURATION 1120 |
|---|---|---|---|---|---|---|---|---|---|---|---|
| DENV | SERVER-01 | ABC | 1 | H1 | U1 | 40-60k | 2013-08-01 18:00:00 | 64800 | 2013-08-01 18:00:05 | 64805 | 6 |
| DENV | SERVER-01 | ABC | 2 | H2 | U2 | 40-60k | 2013-08-01 18:00:01 | 68401 | 2013-08-01 18:00:07 | 68407 | 7 |
| DENV | SERVER-01 | DISC | 3 | H3 | U3 | 60-80K | 2013-08-01 18:00:02 | 68402 | 2013-08-01 18:00:06 | 68406 | 5 |
| DENV | SERVER-01 | DISC | 3 | H3 | U3 | 60-80K | 2013-08-01 18:00:04 | 68404 | 2013-08-01 18:00:06 | 68406 | 3 |
| DENV | SERVER-01 | DISC | 4 | H4 | U4 | 80-110K | 2013-08-01 18:00:03 | 68403 | 2013-08-01 18:00:09 | 68409 | 7 |
| DENV | SERVER-01 | ESPN | 5 | H5 | U5 | 80-110K | 2013-08-01 18:00:04 | 68404 | 2013-08-01 18:00:11 | 68411 | 8 |

FIG. 4
Summary Information

| Specification Name: | Video Viewing Detail File 150 |
|---|---|
| Record description: | The Video Viewing Detail File contains video viewing detail records which have been formatted for use by the MapReduce Aggregation Engine 200. |
| Key (as referred to below in Notes) | The key of this record is:<br>GEOGRAPHIC_ID + VIDEO_SERVER_ID + VIDEO_CONTENT_ID + DEMOGRAPHIC_ID |
| Unique Identifier: | The unique identifier of this record is:<br>GEOGRAPHIC_ID + VIDEO_SERVER_ID + VIDEO_CONTENT_ID + DEMOGRAPHIC_ID + SECOND_OF_DAY_WHEN_TUNED |

Data Structure

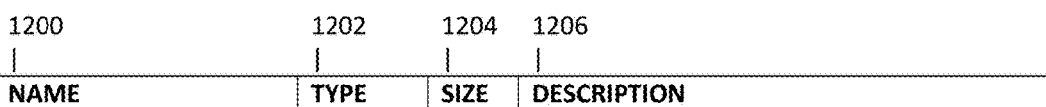

1200         1202    1204   1206

| NAME | TYPE | SIZE | DESCRIPTION |
|---|---|---|---|
| Notes: By putting the Geographic Id in this record, this enables aggregation by any user defined Geographic area. This provides a geographic identifier identifying the location of a video asset viewing device.<br>Notes: By putting the Video Server Id in this record, this enables aggregation by Video Server.<br>Notes: By putting the Demographic Id in this record, this enables aggregation by any user defined demographic identifier. This provides a demographic identifier describing a viewer operating a video asset viewing device.<br>Notes: By putting the Video Content Id in this record, this enables aggregation by any user defined video content grouping such as aggregating by channel call sign, channel source id, video program id, video asset id, and others.<br>Notes: By putting the Second of day when tuned in this record, this enables aggregation of all the viewing activity for the record key to this second of the day.<br>Notes: By putting the Count of 1, this allows MapReduce to count all the viewing activity during this Second of the day for this key. | | | |
| 1210~   GEOGRAPHIC_ID | CHAR | 4 | The Geographic Identifier records the geographic area in which the Viewing Activity occurred. |
| 1220~   VIDEO_SERVER_ID | CHAR | 12 | The Video Server Identifier records the video server or computer system identifier from which the video content was streamed. |

FIG. 4 - Continued

| | | | | |
|---|---|---|---|---|
| 1230~ | `VIDEO_CONTENT_ID` | CHAR | 10 | Video Content Identifier records a value that identifies the video content. This can be: Channel Call Sign, Channel Source Id, Video Program Id, Video Asset Id, or any similar value. |
| 1240~ | `DEMOGRAPHIC_ID` | CHAR | 12 | Demographic Id records a demographic identifier associated with the viewer. This is used to identify demographic code values for things such as age, income, education, occupation, home value, and viewing interests. |
| 1250~ | `SECOND_OF_DAY_WHEN_TUNED` | Number | 5 | Second of Day when tuned records the second of the day represented as seconds past midnight when the viewing activity occurred. This can also be represented as the UNIX epoch time which is the number of seconds since Jan 1, 1970. |
| 1260~ | `COUNT_OF_1` | Number | 1 | Contains the value 1 which will then be aggregated in the MapReduce process. |

FIG. 4 - Continued
Sample Data

| GEO ID | VIDEO SERVER | VIDEO CONTENT | DEMO CODE | SECOND OF DAY WHEN TUNED | COUNT OF 1 |
|---|---|---|---|---|---|
| DENV | SERVER-01 | ABC | 40-60k | 64800 | 1 |
| DENV | SERVER-01 | ABC | 40-60k | 64801 | 1 |
| DENV | SERVER-01 | ABC | 40-60k | 64802 | 1 |
| DENV | SERVER-01 | ABC | 40-60k | 64803 | 1 |
| DENV | SERVER-01 | ABC | 40-60k | 64804 | 1 |
| DENV | SERVER-01 | ABC | 40-60k | 64805 | 1 |
| DENV | SERVER-01 | ABC | 40-60k | 68401 | 1 |
| DENV | SERVER-01 | ABC | 40-60k | 68402 | 1 |
| DENV | SERVER-01 | ABC | 40-60k | 68403 | 1 |
| DENV | SERVER-01 | ABC | 40-60k | 68404 | 1 |
| DENV | SERVER-01 | ABC | 40-60k | 68405 | 1 |
| DENV | SERVER-01 | ABC | 40-60k | 68406 | 1 |
| DENV | SERVER-01 | ABC | 40-60k | 68407 | 1 |
| DENV | SERVER-01 | DISC | 60-80K | 68402 | 1 |
| DENV | SERVER-01 | DISC | 60-80K | 68403 | 1 |
| DENV | SERVER-01 | DISC | 60-80K | 68404 | 1 |
| DENV | SERVER-01 | DISC | 60-80K | 68405 | 1 |
| DENV | SERVER-01 | DISC | 60-80K | 68406 | 1 |
| DENV | SERVER-01 | DISC | 60-80K | 68404 | 1 |
| DENV | SERVER-01 | DISC | 60-80K | 68405 | 1 |
| DENV | SERVER-01 | DISC | 60-80K | 68406 | 1 |
| DENV | SERVER-01 | DISC | 80-110K | 68403 | 1 |
| DENV | SERVER-01 | DISC | 80-110K | 68404 | 1 |
| DENV | SERVER-01 | DISC | 80-110K | 68405 | 1 |
| DENV | SERVER-01 | DISC | 80-110K | 68406 | 1 |
| DENV | SERVER-01 | DISC | 80-110K | 68407 | 1 |
| DENV | SERVER-01 | DISC | 80-110K | 68408 | 1 |
| DENV | SERVER-01 | DISC | 80-110K | 68409 | 1 |
| DENV | SERVER-01 | ESPN | 80-110K | 68404 | 1 |
| DENV | SERVER-01 | ESPN | 80-110K | 68405 | 1 |
| DENV | SERVER-01 | ESPN | 80-110K | 68406 | 1 |
| DENV | SERVER-01 | ESPN | 80-110K | 68407 | 1 |
| DENV | SERVER-01 | ESPN | 80-110K | 68408 | 1 |
| DENV | SERVER-01 | ESPN | 80-110K | 68409 | 1 |
| DENV | SERVER-01 | ESPN | 80-110K | 68410 | 1 |
| DENV | SERVER-01 | ESPN | 80-110K | 68411 | 1 |

FIG. 5

Summary Information

| Specification Name: | Aggregated Video Viewing Geo+Server+Content+Demo File 220 |
|---|---|
| Record description: | The Aggregated Video Viewing Geo+Server+Content+Demo File contains aggregated video viewing activity which has been aggregated by the MapReduce Aggregation Engine 200.<br><br>This record provides aggregated video viewing activity for each combination of geographic area and server id and content id and demographic id for each second of the aggregation period. This data will provide insight into viewing of the content by demographic group within the other identifiers. |
| Unique Identifier: | The unique identifier of this record is:<br>`GEOGRAPHIC_ID + VIDEO_SERVER_ID + VIDEO_CONTENT_ID + DEMOGRAPHIC_ID + SECOND_OF_DAY_WHEN_TUNED` |

Data Structure

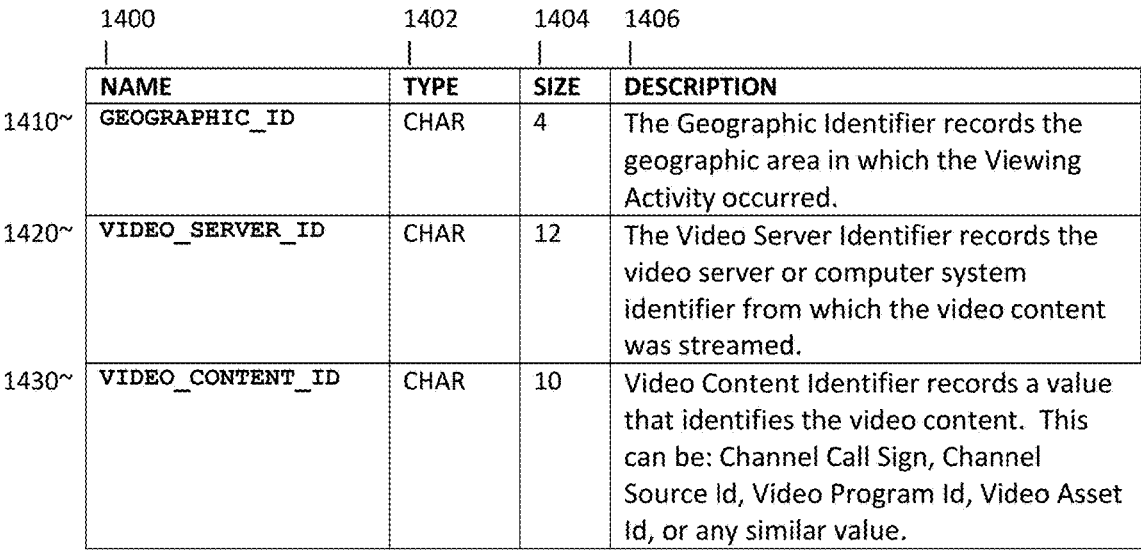

|   | 1400 | 1402 | 1404 | 1406 |
|---|---|---|---|---|
|   | NAME | TYPE | SIZE | DESCRIPTION |
| 1410~ | GEOGRAPHIC_ID | CHAR | 4 | The Geographic Identifier records the geographic area in which the Viewing Activity occurred. |
| 1420~ | VIDEO_SERVER_ID | CHAR | 12 | The Video Server Identifier records the video server or computer system identifier from which the video content was streamed. |
| 1430~ | VIDEO_CONTENT_ID | CHAR | 10 | Video Content Identifier records a value that identifies the video content. This can be: Channel Call Sign, Channel Source Id, Video Program Id, Video Asset Id, or any similar value. |

FIG. 5 - Continued

| | | | | |
|---|---|---|---|---|
| 1440~ | DEMOGRAPHIC_ID | CHAR | 12 | Demographic Id records a demographic identifier associated with the viewer. This is used to identify demographic code values for things such as age, income, education, occupation, home value, and viewing interests. |
| 1450~ | SECOND_OF_DAY_WHEN _TUNED | Number | 5 | Second of Day when tuned records the second of the day represented as seconds past midnight when the viewing activity occurred. This can also be represented as the UNIX epoch time which is the number of seconds since Jan 1, 1970. |
| 1460~ | VIEWING_DEVICE_COU NT | Number | 5 | Viewing Device Count records a count of the number of viewing devices (identified by the various identifiers in this record) that were viewing the video content during the corresponding second of the day. |

FIG. 5 - Continued
Sample Data

| GEO ID | VIDEO SERVER | VIDEO CONTENT | DEMO CODE | SECOND OF DAY WHEN TUNED | VIEWING DEVICE COUNT |
|---|---|---|---|---|---|
| DENV | SERVER-01 | ABC | 40-60k | 64800 | 1 |
| DENV | SERVER-01 | ABC | 40-60k | 64801 | 2 |
| DENV | SERVER-01 | ABC | 40-60k | 64802 | 2 |
| DENV | SERVER-01 | ABC | 40-60k | 64803 | 2 |
| DENV | SERVER-01 | ABC | 40-60k | 64804 | 2 |
| DENV | SERVER-01 | ABC | 40-60k | 64805 | 2 |
| DENV | SERVER-01 | ABC | 40-60k | 68406 | 1 |
| DENV | SERVER-01 | ABC | 40-60k | 68407 | 1 |
| | | | | | |
| DENV | SERVER-01 | DISC | 60-80K | 68402 | 1 |
| DENV | SERVER-01 | DISC | 60-80K | 68403 | 1 |
| DENV | SERVER-01 | DISC | 60-80K | 68404 | 2 |
| DENV | SERVER-01 | DISC | 60-80K | 68405 | 2 |
| DENV | SERVER-01 | DISC | 60-80K | 68406 | 2 |
| | | | | | |
| DENV | SERVER-01 | DISC | 80-110K | 68403 | 1 |
| DENV | SERVER-01 | DISC | 80-110K | 68404 | 1 |
| DENV | SERVER-01 | DISC | 80-110K | 68405 | 1 |
| DENV | SERVER-01 | DISC | 80-110K | 68406 | 1 |
| DENV | SERVER-01 | DISC | 80-110K | 68407 | 1 |
| DENV | SERVER-01 | DISC | 80-110K | 68408 | 1 |
| DENV | SERVER-01 | DISC | 80-110K | 68409 | 1 |
| | | | | | |
| DENV | SERVER-01 | ESPN | 80-110K | 68404 | 1 |
| DENV | SERVER-01 | ESPN | 80-110K | 68405 | 1 |
| DENV | SERVER-01 | ESPN | 80-110K | 68406 | 1 |
| DENV | SERVER-01 | ESPN | 80-110K | 68407 | 1 |
| DENV | SERVER-01 | ESPN | 80-110K | 68408 | 1 |
| DENV | SERVER-01 | ESPN | 80-110K | 68409 | 1 |
| DENV | SERVER-01 | ESPN | 80-110K | 68410 | 1 |
| DENV | SERVER-01 | ESPN | 80-110K | 68411 | 1 |

FIG. 6

Summary Information

| Specification Name: | Aggregated Video Viewing Geo+Server+Content File 230 |
|---|---|
| Record description: | The Aggregated Video Viewing Geo+Server+Content File contains aggregated video viewing activity which has been aggregated by the MapReduce Aggregation Engine 200.<br><br>This record provides aggregated video viewing activity within the geographic area and server id and content id for each second of the aggregation period.  This data will provide insight into viewing of the content across demographic groups. |
| Unique Identifier: | The unique identifier of this record is:<br>`GEOGRAPHIC_ID + VIDEO_SERVER_ID + VIDEO_CONTENT_ID + SECOND_OF_DAY_WHEN_TUNED` |

Data Structure

```
      1600                1602    1604   1606
       |                   |       |      |
```

| | NAME | TYPE | SIZE | DESCRIPTION |
|---|---|---|---|---|
| 1610~ | GEOGRAPHIC_ID | CHAR | 4 | The Geographic Identifier records the geographic area in which the Viewing Activity occurred. |
| 1620~ | VIDEO_SERVER_ID | CHAR | 12 | The Video Server Identifier records the video server or computer system identifier from which the video content was streamed. |
| 1630~ | VIDEO_CONTENT_ID | CHAR | 10 | Video Content Identifier records a value that identifies the video content.  This can be: Channel Call Sign, Channel Source Id, Video Program Id, Video Asset Id, or any similar value. |
| 1650~ | SECOND_OF_DAY_WHEN_TUNED | Number | 5 | Second of Day when tuned records the second of the day represented as seconds past midnight when the viewing activity occurred.<br>This can also be represented as the UNIX epoch time which is the number of seconds since Jan 1, 1970. |

FIG. 6 - Continued

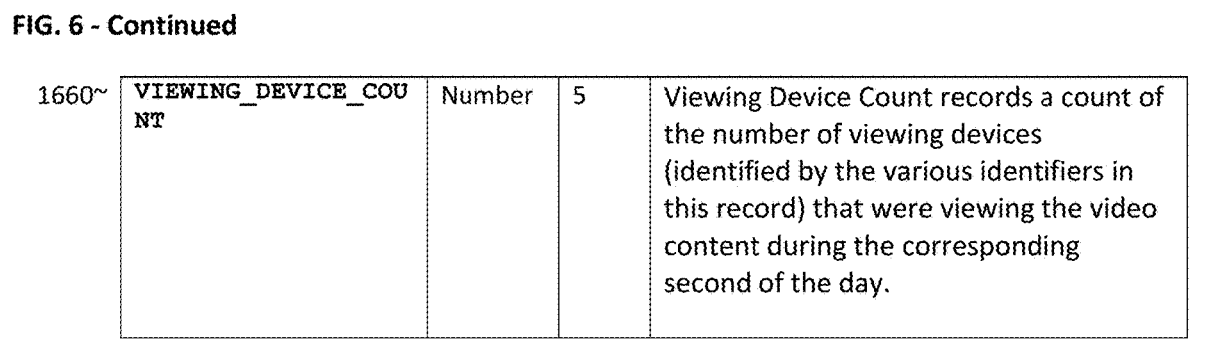

| 1660~ | VIEWING_DEVICE_COUNT | Number | 5 | Viewing Device Count records a count of the number of viewing devices (identified by the various identifiers in this record) that were viewing the video content during the corresponding second of the day. |
|---|---|---|---|---|

FIG. 6 - Continued
Sample Data

| Aggregate by Geo ID, Video Server, Video Content | | | | |
|---|---|---|---|---|
| GEO ID | VIDEO SERVER | VIDEO CONTENT | SECOND OF DAY WHEN TUNED | VIEWING DEVICE COUNT |
| DENV | SERVER-01 | ABC | 64800 | 1 |
| DENV | SERVER-01 | ABC | 64801 | 2 |
| DENV | SERVER-01 | ABC | 64802 | 2 |
| DENV | SERVER-01 | ABC | 64803 | 2 |
| DENV | SERVER-01 | ABC | 64804 | 2 |
| DENV | SERVER-01 | ABC | 64805 | 2 |
| DENV | SERVER-01 | ABC | 68406 | 1 |
| DENV | SERVER-01 | ABC | 68407 | 1 |
|  |  |  |  |  |
| DENV | SERVER-01 | DISC | 68402 | 1 |
| DENV | SERVER-01 | DISC | 68403 | 2 |
| DENV | SERVER-01 | DISC | 68404 | 3 |
| DENV | SERVER-01 | DISC | 68405 | 3 |
| DENV | SERVER-01 | DISC | 68406 | 3 |
| DENV | SERVER-01 | DISC | 68407 | 1 |
| DENV | SERVER-01 | DISC | 68408 | 1 |
| DENV | SERVER-01 | DISC | 68409 | 1 |
|  |  |  |  |  |
| DENV | SERVER-01 | ESPN | 68404 | 1 |
| DENV | SERVER-01 | ESPN | 68405 | 1 |
| DENV | SERVER-01 | ESPN | 68406 | 1 |
| DENV | SERVER-01 | ESPN | 68407 | 1 |
| DENV | SERVER-01 | ESPN | 68408 | 1 |
| DENV | SERVER-01 | ESPN | 68409 | 1 |
| DENV | SERVER-01 | ESPN | 68410 | 1 |
| DENV | SERVER-01 | ESPN | 68411 | 1 |

FIG. 7

Summary Information

| Specification Name: | Aggregated Video Viewing Content File 240 |
|---|---|
| Record description: | The Aggregated Video Viewing Content File contains aggregated video viewing activity which has been aggregated by the MapReduce Aggregation Engine 200.

This record provides aggregated video viewing activity across all geographic identifiers, all servers, and all demographic groups for each second of the aggregation period. This option will provide insight into viewing of the content (channel) across all geographic areas, video servers, and demographic groups. As a non-limiting example, this could be used as input to measure national ratings of a channel across all the seconds of the day or of a particular program airing at a certain time. |
| Unique Identifier: | The unique identifier of this record is:
`VIDEO_CONTENT_ID + SECOND_OF_DAY_WHEN_TUNED` |

Data Structure

```
    1800              1802   1804  1806
    |                 |      |     |
```

| | NAME | TYPE | SIZE | DESCRIPTION |
|---|---|---|---|---|
| 1830~ | `VIDEO_CONTENT_ID` | CHAR | 10 | Video Content Identifier records a value that identifies the video content. This can be any of these: Channel Call Sign, Channel Source Id, Video Program Id, Video Asset Id, or any similar value. |
| 1850~ | `SECOND_OF_DAY_WHEN _TUNED` | Number | 5 | Second of Day when tuned records the second of the day represented as seconds past midnight when the viewing activity occurred. This can also be represented as the UNIX epoch time which is the number of seconds since Jan 1, 1970. |

FIG. 7 - Continued

| 1860~ | VIEWING_DEVICE_COUNT | Number | 5 | Viewing Device Count records a count of the number of viewing devices that were viewing the video content during the corresponding second of the day. |
|---|---|---|---|---|

FIG. 7 - Sample Data - Continued

| Aggregate by Video Content | | |
|---|---|---|
| VIDEO CONTENT | SECOND OF DAY WHEN TUNED | VIEWING DEVICE COUNT |
| ABC | 64800 | 1 |
| ABC | 64801 | 2 |
| ABC | 64802 | 2 |
| ABC | 64803 | 2 |
| ABC | 64804 | 2 |
| ABC | 64805 | 2 |
| ABC | 68406 | 1 |
| ABC | 68407 | 1 |
| DISC | 68402 | 1 |
| DISC | 68403 | 2 |
| DISC | 68404 | 3 |
| DISC | 68405 | 3 |
| DISC | 68406 | 3 |
| DISC | 68407 | 1 |
| DISC | 68408 | 1 |
| DISC | 68409 | 1 |
| ESPN | 68404 | 1 |
| ESPN | 68405 | 1 |
| ESPN | 68406 | 1 |
| ESPN | 68407 | 1 |
| ESPN | 68408 | 1 |
| ESPN | 68409 | 1 |
| ESPN | 68410 | 1 |
| ESPN | 68411 | 1 |

FIG. 8

Summary Information

| Specification Name: | Aggregated Video Viewing File 250 |
|---|---|
| Record description: | The Aggregated Video Viewing File contains aggregated video viewing activity which has been aggregated by the MapReduce Aggregation Engine 200.<br><br>This record provides aggregated video viewing activity across all geographic identifiers, all servers, all content, and all demographic groups for each second of the aggregation period. This option will provide insight into total viewing activity during each second of the measurement period.<br><br>As a non-limiting example, this could be used as input to any calculation which requires total viewing activity during any particular second. This value may be used as the denominator in a calculation which measures the percentage of the total viewing audience that a particular piece of content earned. |
| Unique Identifier: | The unique identifier of this record is:<br>SECOND_OF_DAY_WHEN_TUNED |

Data Structure

2000                   2002    2004  2006

| | NAME | TYPE | SIZE | DESCRIPTION |
|---|---|---|---|---|
| 2050~ | SECOND_OF_DAY_WHEN_TUNED | Number | 5 | Second of Day when tuned records the second of the day represented as seconds past midnight when the viewing activity occurred.<br>This can also be represented as the UNIX epoch time which is the number of seconds since Jan 1, 1970. |
| 2060~ | VIEWING_DEVICE_COUNT | Number | 5 | Viewing Device Count records a count of the number of viewing devices (identified by the various identifiers in this record) that were viewing the video content during the corresponding second of the day or during the second represented by the UNIX epoch. |

FIG. 8 - Continued
Sample Data

| Aggregate by Second of Day When Tuned | |
|---|---|
| SECOND OF DAY WHEN TUNED | VIEWING DEVICE COUNT |
| 64800 | 1 |
| 64801 | 2 |
| 64802 | 3 |
| 64803 | 4 |
| 64804 | 6 |
| 64805 | 6 |
| 68406 | 5 |
| 68407 | 3 |
| 68408 | 2 |
| 68409 | 2 |
| 68410 | 1 |
| 68411 | 1 |

MEASURING VIDEO-CONTENT VIEWING

CROSS-REFERENCE TO RELATED APPLICATIONS

This application is a continuation of and claims priority to U.S. application Ser. No. 18/135,565, filed Apr. 17, 2023, which is a continuation of U.S. application Ser. No. 17/533, 375, filed Nov. 23, 2021, now U.S. Pat. No. 11,677,998, which is a continuation of U.S. application Ser. No. 17/229, 357, filed Apr. 13, 2021, now U.S. Pat. No. 11,212,565, which is a continuation of U.S. patent application Ser. No. 16/730,423, filed on Dec. 30, 2019, now U.S. Pat. No. 11,012,726, which is a continuation of U.S. patent application Ser. No. 14/013,031, filed on Aug. 29, 2013, now U.S. Pat. No. 10,645,433, which are hereby incorporated by reference in their entireties.

This application is related to U.S. Pat. No. 8,365,212 B1 issued on Jan. 29, 2013 entitled "SYSTEM AND METHOD FOR ANALYZING HUMAN INTERACTION WITH ELECTRONIC DEVICES THAT ACCESS A COMPUTER SYSTEM THROUGH A NETWORK" by the present inventor which is incorporated by reference in its entirety but is not admitted to be prior art.

This application is also related to U.S. Pat. No. 8,365,213 B1 issued on Jan. 29, 2013 entitled "SYSTEM AND METHOD FOR MEASURING TELEVISION ADVERTISING AND PROGRAM VIEWING AT A SECOND-BY-SECOND LEVEL AND FOR MEASURING EFFECTIVENESS OF TARGETED ADVERTISING" by the present inventor which is incorporated by reference in its entirety but is not admitted to be prior art.

This application is also related to the co-pending application U.S. application Ser. No. 13/360,704 filed on Jan. 28, 2012 entitled "SYSTEM AND METHOD FOR MEASURING LONGITUDINAL VIDEO ASSET VIEWING AT A SECOND-BY-SECOND LEVEL TO UNDERSTAND BEHAVIOR OF VIEWERS AS THEY INTERACT WITH VIDEO ASSET VIEWING DEVICES THAT ACCESS A COMPUTER SYSTEM THROUGH A NETWORK" by the present inventor which is incorporated by reference in its entirety but is not admitted to be prior art.

This application is also related to the co-pending application U.S. application Ser. No. 13/567,073 filed on Aug. 5, 2012 entitled "SYSTEM AND METHOD FOR MEASURING LINEAR, DVR, AND VOD VIDEO PROGRAM VIEWING AT A SECOND-BY-SECOND LEVEL TO UNDERSTAND BEHAVIOR OF VIEWERS AS THEY INTERACT WITH VIDEO ASSET VIEWING DEVICES DELIVERING CONTENT THROUGH A NETWORK" by the present inventor which is incorporated by reference in its entirety but is not admitted to be prior art.

This application is also related to the co-pending application U.S. application Ser. No. 13/740,199 filed on Jan. 13, 2013 entitled "SYSTEM AND METHOD FOR MEASURING DEMOGRAPHIC-BASED HOUSEHOLD ADVERTISING REACH; IMPRESSIONS, SHARE, HUT, RATING, AND CUMULATIVE AUDIENCE; AND VIDEO PROGRAM VIEWING, BASED ON SECOND-BY-SECOND HOUSE LEVEL VIEWING ACTIVITY, TO UNDERSTAND BEHAVIOR OF VIEWERS AS THEY INTERACT WITH VIDEO ASSET VIEWING DEVICES DELIVERING CONTENT THROUGH A NETWORK" by the present inventor which is incorporated by reference in its entirety but is not admitted to be prior art.

BACKGROUND

Prior Art

I have not found any relevant prior art at the present time.

BACKGROUND INFORMATION

General Statement of Problem

With the ever increasing number of consumer choices for television viewing, it is important for advertisers, content producers, and service providers such as cable television and satellite television and internet protocol television companies to be able to accurately measure audience viewership. I have discussed this problem extensively in my prior applications. This application teaches how to analyze video viewing activity using the Hadoop MapReduce distributed computing framework.

Existing Tools for Data Analysis

In my prior applications I taught how to analyze video viewing activity (channel tuning data) using various methods that rely on loading data into arrays in the memory of a computer. In certain cases, an analyst may wish to use the Hadoop MapReduce distributed computing framework to analyze video viewing activity. I have not identified any patents that teach how to use MapReduce to solve this problem.

SUMMARY

In accordance with one embodiment, I disclose a computer-implemented method of aggregating video viewing activity data using the Hadoop MapReduce distributed computing framework. This will allow an analyst to aggregate second-by-second video viewing activity for various kinds of video content. Once this data has been aggregated, it can be used in any number of downstream analytic processes to provide detailed information on customer viewing behavior which can be used to drive business decisions for service providers, advertisers, and content producers.

Advantages

By using the Hadoop MapReduce distributed computing framework to aggregate the video viewing activity, an analyst can harness the power of hundreds or even thousands of processors working in parallel to solve the problem of aggregating video viewing activity data. This will allow an analyst to work with data sets of all sizes including extremely large data sets. The resulting files can be loaded to a relational database for various analytics similar to what I have taught in my other Patent Applications referenced previously. Additionally, the resulting files can be used in other Hadoop processes to correlate video viewing activity with other social media activity, with weather, with other programming content, and similar uses.

Definitions

The following are definitions that will aid in understanding one or more of the embodiments presented herein:

Computer readable format means any data format that can be read by a computer program or a human being as necessary. Nonlimiting examples include:

I. formatted text files,

II. pipe delimited text files,

III. data base tables,

IV. Extensible Markup Language (XML) messages,

V. a printed report,

VI. JavaScript Object Notation messages.

Data analysis computer system means a combination of one or more computers on which a Data Analysis Program or Programs or Hadoop or MapReduce processes can be executed. Nonlimiting examples include:

I. one or more computers where video viewing activity data can be used to create video viewing detail records, II. a single computer running the MapReduce distributed computing framework for parallel processing, III. a cluster of many computers running the MapReduce distributed computing framework for parallel processing where many means a few to hundreds or even thousands, IV. a Hadoop cluster of computers.

Data analysis computer of known type means any commonly available computer system running a commonly known operating system. Nonlimiting examples include:

I. a standard personal computer running WINDOWS 7 Professional operating system from MICROSOFT® Corporation, II. a computer running the UNIX operating system, III. a computer running the Linux operating system, IV. a computer in a cloud computing environment, V. a mainframe computer with its operating system.

Data analysis program means a computer program or programs that are able to execute on a Data analysis computer of known type. Nonlimiting examples include:

I. a Pig Latin script running MapReduce,

II. a JAVA program running MapReduce,

III. a Python script running MapReduce,

IV. a COBOL program.

Demographic information means any data item that can describe a characteristic of a viewer or a subscriber or a household associated with a viewer who is operating the video asset viewing device. Nonlimiting examples include income, ethnicity, gender, age, marital status, location, geographic area, postal code, census data, occupation, social grouping, family status, any proprietary demographic grouping, segmentation, credit score, dwelling type, homeownership status, property ownership status, rental status, vehicle ownership, tax rolls, credit card usage, religious affiliation, sports interest, political party affiliation, cable television subscriber type, cable television subscriber package level, and cell phone service level.

Device Characteristic means any feature or capability or aspect or descriptive qualifier or identifier of a video viewing device. Nonlimiting examples include that this may identify the type of device such as a set-top box, a tablet, a smart phone; a capability of the device such as the ability to record video or to support multiple viewing windows, or a manufacturer identifier.

Device Type is a subset of Device Characteristic where device type may, as a nonlimiting example, identify the type of device such as a set-top box, a tablet, a smart phone.

Geographic information means any service area or any network hierarchy designation or marketing area or other designated area used by a cable television company or a satellite television company or IP Television delivery company or video asset delivery system. The boundary or description of a geographic area is defined based on the needs of the service provider. Nonlimiting examples include a Market in a cable company network, a Headend in a cable company network, a Hub in a cable company network, a census tract, a cell tower identifier, a service area for satellite TV, advertising zone, a zip code, or some other geographic identifier. The geographic information may then be used to identify the location of a video asset viewing device or geographic information about the house associated with the device or the location of the device at the time of the viewer interaction in the event that the viewer interaction occurs in a location different than the location of the house associated with the device.

Network means any computer network. Nonlimiting examples include:

I. a cable television network,

II. a cellular telephony network,

III. hybrid fiber coax system,

IV. a satellite television network,

V. a wi-fi network,

VI. any means that supports communication among video asset viewing devices or electronic devices or computers or computer systems.

Pipe delimited text files means data files where the fields are separated by the "|" character.

Set-top box means a video asset viewing device that receives external signals and decodes those signals into content that can be viewed on a television screen or similar display device. The signals may come from a cable television system, a satellite television system, a network, or any other suitable means. A set-top box may have one or more tuners. The set-top box allows the user to interact with it to control what is displayed on the television screen. The set-top box is able to capture the commands given by the user and then transmit those commands to another computer system. For purposes of this application, stating that a set-top box tunes to a channel is equivalent to stating that a tuner in a set-top box has tuned to a channel. A set-top box may also play back previously recorded video content.

STB means Set-top box.

Tuner means a tuner in a Set-top box.

Tuner index means an identifier of a tuner in a Set-top box.

Video asset means any programming content that may be viewed and/or heard. A Video Program may contain multiple Video Assets. Nonlimiting examples of Video Asset include:

I. advertisements or commercials,

II. movies,

III. sports programs,

IV. news casts,

V. music,

VI. television programs,

VII. video recordings.

Video asset viewing device means any electronic device that may be used either directly or indirectly by a human being to interact with video content where the video content is provided by a cable television system or a satellite television system or a computer system accessed through a network. Nonlimiting examples include: Gaming station, web browser, MP3 Player, Internet Protocol phone, Internet Protocol television, mobile device, mobile smart phone, set-top box, satellite television receiver, set-top box in a cable television network, set-top box in a satellite television system, cell phone, personal communication device, personal video recorder, personal video player, two-way interactive service platforms, personal computer, tablet device.

Video server delivering video content through a network means any computer system, any individual piece of computer equipment or electronic gear, or any combination of computer equipment or electronic gear which enables or facilitates the viewer interaction with the video asset viewing device. Nonlimiting examples include:

I. cable television system,
II. cable television switched digital video system,
III. cellular phone network,
IV. satellite television system,
V. web server,
VI. any individual piece of computer equipment or electronic gear,
VII. any combination of computer equipment or electronic gear.

Video viewing activity means any identifiable activity that a Video asset viewing device operator may do in regard to a Video asset viewing device and where such activity can be captured by the video asset viewing device or by the video server delivering video content through a network that supports the device. Nonlimiting examples include:

I. power on/power off, open web page, close web page,
II. channel up/channel down/channel selection, play video content on web browser,
III. volume up/volume down/mute/unmute,
IV. any trick play such as fast forward, rewind, pause
V. recording video content,
VI. playing back recorded video content,
VII. invoking a menu, choosing a menu option,
VIII. any response to a screen prompt
IX. playing live video content.

Video viewing activity means any measurements or aggregations produced by the MapReduce distributed computing framework as it aggregates video viewing detail records or any value calculated by a Data Analysis Program as part of this process.

Viewer means the human being causing a Viewer interaction; the user of a Set-top box or a Video asset viewing device.

BRIEF DESCRIPTION OF THE DRAWINGS

FIG. 3 illustrates an exemplary record layout for a Video Viewing Activity Data File 130 record along with sample data, according to one embodiment.

FIG. 4 illustrates an exemplary record layout for a Video Viewing Detail Data File 150 record along with sample data, according to one embodiment.

FIG. 5 illustrates an exemplary record layout for an Aggregated Video Viewing Geo+Server+Content+Demo File 220 record along with sample data, according to one embodiment.

FIG. 6 illustrates an exemplary record layout for an Aggregated Video Viewing Geo+Server+Content File 230 record along with sample data, according to one embodiment.

FIG. 7 illustrates an exemplary record layout for an Aggregated Video Viewing Content File 240 record along with sample data, according to one embodiment.

FIG. 8 illustrates an exemplary record layout for an Aggregated Video Viewing File 250 record along with sample data, according to one embodiment

DETAILED DESCRIPTION OF THE DRAWINGS

Figure 1:
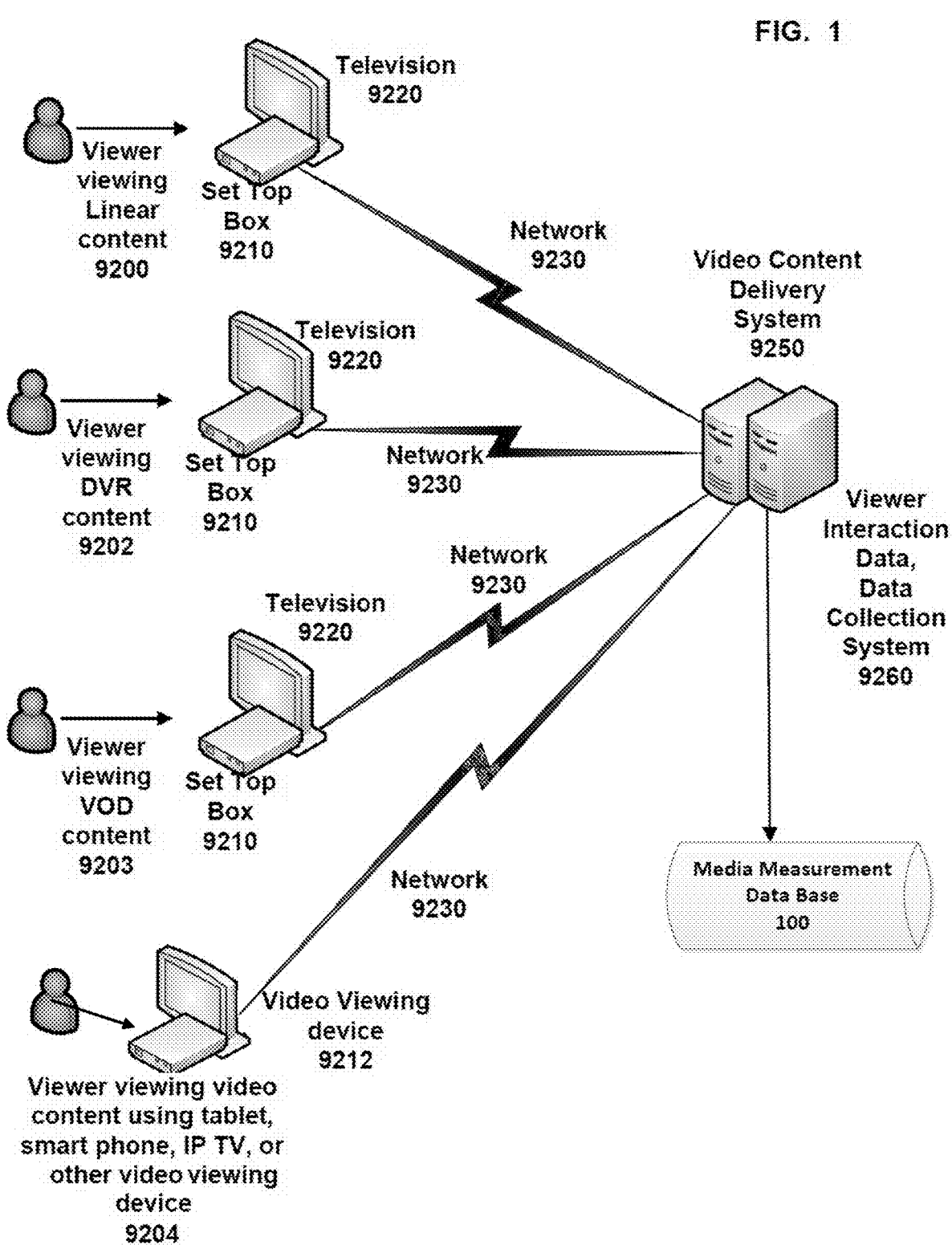
FIG. 1 provides an overview of an exemplary process for collecting viewer interaction data derived from a plurality of viewers interacting with video content that was delivered on a plurality of video asset viewing devices delivering content through a network and then loading that data to a Media Measurement Data Base.

When reading the information below, it can be appreciated that these are merely samples of table layouts, format and content, and many aspects of these tables may be varied or expanded within the scope of the embodiment. The table layouts, field formats and content, algorithms, and other aspects are what I presently contemplate for this embodiment, but other table layouts, field formats and content, algorithms, etc. can be used. The algorithms are samples and various aspects of the algorithms may be varied or expanded within the scope of the embodiment.

In one embodiment the MapReduce Aggregation Engine 200 can be implemented on computer clusters running a standard Hadoop distribution from Apache under the Linux operating system. The MapReduce Aggregation Engine 200 can be implemented in JAVA or Pig. The reader may find more information about various Apache open source projects from The Apache Software Foundation at http://apache.org. Pig is a dataflow scripting language used to run data flows on Hadoop. Pig uses the Hadoop Distributed File System and the Hadoop processing system which is MapReduce. Pig is an Apache open source project. The reader may find more information about Pig at http://pig.apache.org. Those skilled in the art will readily recognize these tools.

Note on Media Measurement Data Model

Cable Television Laboratories, Inc. has published an "Audience Data Measurement Specification" as "Open-Cable™ Specifications, Audience Measurement, Audience Measurement Data Specification" having Document Control Number "OC-SP-AMD-101-130502" copyright@ Cable Television Laboratories, Inc. 2013 which contains a Media Measurement Data Model database design which can be used as a source of data for the MapReduce Aggregation Engine 200 which I teach how to build in this Application. The teaching in my present application can be implemented in conjunction with that Media Measurement Data Model or with any number of data models as long as the required input data is provided as described herein.

Additionally, my MapReduce Aggregation Engine 200 creates files which may be used to load additional tables in a Media Measurement Data Model such as the one published by Cable Television Laboratories, Inc. These files are described in FIGS. 5 to 8.

Note: Numbering in the Drawings—The numbers in the drawings are usually, but not always, in sequential order.

FIG. 1 provides an overview of an exemplary process for collecting viewer interaction data derived from a plurality of viewers interacting with video content that was delivered on a plurality of video asset viewing devices delivering content through a network and then loading that data to a Media Measurement Data Base. This figure illustrates several viewers interacting with video asset viewing devices to view content which was delivered to those devices across a network and then to collect viewing activity from those devices.

In this nonlimiting example, the purpose is not to describe in detail the operations of video content delivery network or a data collection process, but simply to show how the data that is collected from that system can be made available to my MapReduce Aggregation Engine 200.

It begins with Viewer Viewing Linear Content 9200 who is interacting with a set-top box 9210 and television 9220 as he views linear content. The set-top box 9210 interacts with a Video Content Delivery System 9250 which delivers the content across a Network 9230.

It continues with Viewer Viewing DVR Content 9202 who is interacting with a set-top box 9210 and television 9220 as he interacts with DVR content recording content and playing back recorded content using various modes including trick plays. The set-top box 9210 interacts with a Video Content Delivery System 9250 which delivers the content across a Network 9230.

It continues with Viewer Viewing VOD Content 9203 who is interacting with a set-top box 9210 and television 9220 as he interacts with VOD content playing the content using various modes including trick plays. The set-top box 9210 interacts with a Video Content Delivery System 9250 which delivers the content across a Network 9230.

It continues with Viewer viewing video content using tablet, smart phone, IP TV, or other video viewing device 9204 who is interacting with a variety of Video Viewing Devices 9212, including but not limited to tablet, smart phone, IP TV, PC, etc. The video viewing device interacts with a Video Content Delivery System 9250 which delivers the content across a Network 9230.

Video Content Delivery System 9250 then interacts with a Viewer Interaction Data, Data Collection System 9260 which collects all manner of viewer interaction data including Linear viewing including time-shifted linear viewing, Digital Video Recorder recording and playback/viewing, and Video on Demand viewing. The Viewer Interaction Data, Data Collection System 9260 then processes the data as needed to load it to a Media Measurement Data Base 100. The data in the Media Measurement Data Base 100 can then be used as input to my Aggregation Engine 200 as described in FIG. 2.

Figure 2:
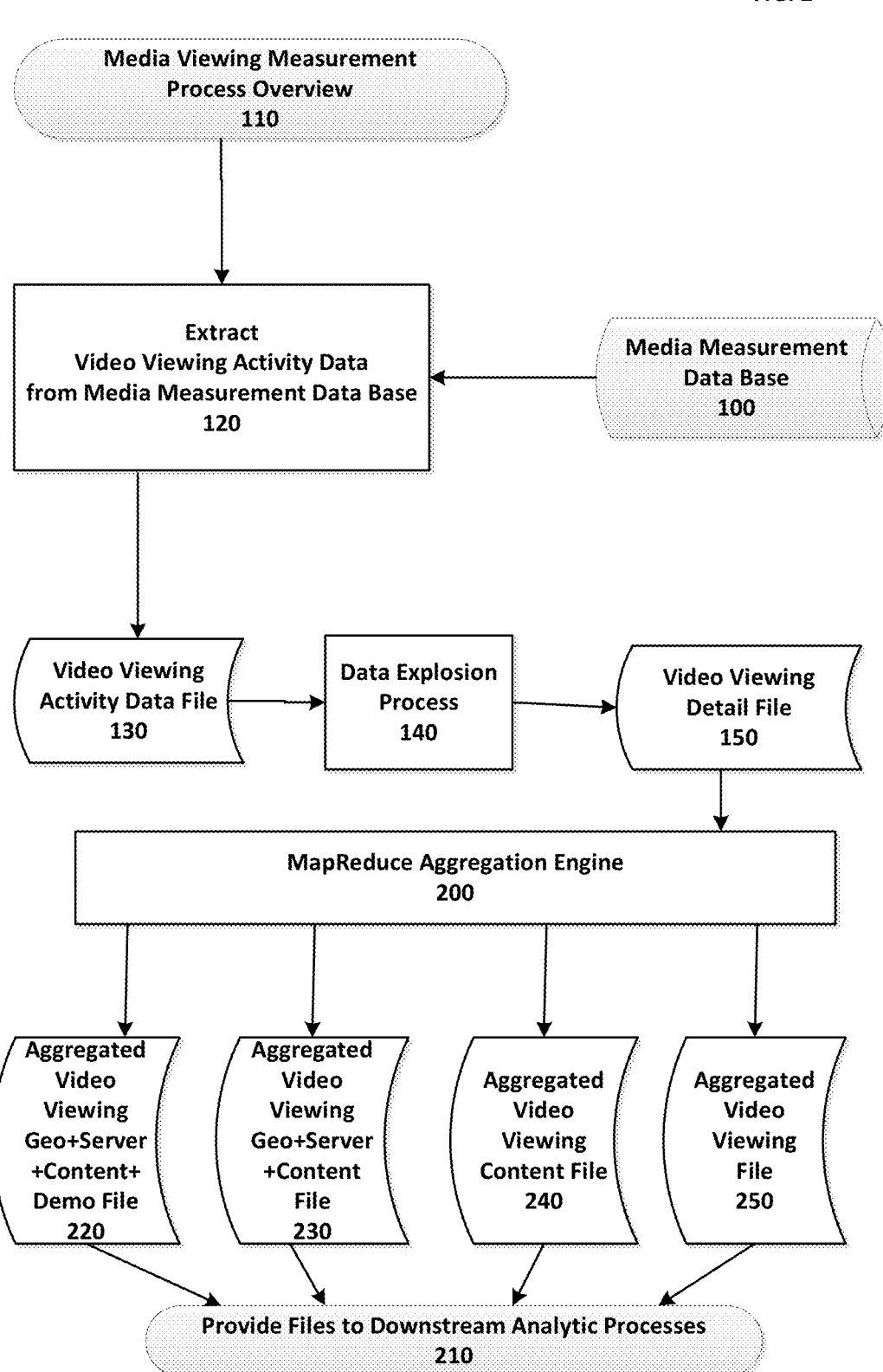
FIG. 2 illustrates an exemplary media measurement process from creation of the video viewing activity data file to creation of the various aggregated video viewing activity files which can then be used in downstream analytic processes.

FIG. 2 illustrates an exemplary media measurement process from creation of the Video Viewing Activity Data File 130 to creation of the various aggregated video viewing activity files (Parts 220, 230, 240, 250) which can then be provided to downstream analytic processes as shown by Provide Files to Downstream Analytic Processes 210.

As noted previously, the video viewing activity may be sourced from a Media Measurement Data Base such as the one described in the Cable Television Laboratories, Inc. specification. The populating of the Media Measurement Database 100 is beyond the scope of this application and so only brief remarks will be made in reference to that. There are video viewing data collection systems that are commonly used in the industry for collecting channel tuning or video viewing activity data including switched digital video systems, set top box applications, internet protocol video viewing applications, and other video viewing applications. These systems enable the collection of the video viewing events which can be loaded to a Media Measurement Database 100. From such a database, Video Viewing Activity Data can be extracted in a format similar to that shown in FIG. 3 Video Viewing Activity Data File 130.

Proceeding with the review of FIG. 2, the process begins with Media Viewing Measurement Process Overview 110. The first step is to extract the video viewing events as per Extract Video Viewing Activity Data from Media Measurement Data Base 120. Those skilled in the art will have no difficulty creating a database query or similar process to extract data from a Media Measurement Database 100 or other source and making it available in a format similar to that defined in Video Viewing Activity Data File 130. The file structure is defined in FIG. 3 Video Viewing Activity Data File 130 which describes an exemplary format for the input video viewing activity data. As part of the extract process, the system may perform the following activities to prepare the data for processing:

Discard tuning events having a duration less than a specified number of seconds

Truncate tuning events having a duration greater than a specified number of seconds Map channels such that viewing of a high definition and a standard definition version of the same channel are assigned the same channel call sign Other data preparation activities can be done according to business needs. Those with reasonable skill in the art will readily recognize how to perform these activities.

Proceeding with the review of FIG. 2, the Video Viewing Activity Data File 130 is then passed to a Data Explosion Process 140. In this process the individual tuning events are exploded such that there is one record created for every second of the tune duration represented in the video viewing activity record. Additionally, the detail keys and the tune-in datetime and tune-out datetime and tune duration can be discarded at this time because the MapReduce process will aggregate across those detail keys. In an alternative embodiment, any field that is not used in the aggregation process could be omitted from the Video Viewing Activity Data File 130 file. I have included these additional fields to provide a comprehensive picture recognizing that one can always drop the fields that they choose not to use.

The computer algorithm that the Data Explosion Process 140 runs to create the Video Viewing Detail File 150 is as follows:

```
Looping process to create the video viewing detail
records:
For each input record in Video Viewing Activity Data File 130
    PERFORM VARYING SUB
        FROM TUNE_IN_SECOND_OF_DAY 1090
        BY 1
        UNTIL SUB > TUNE_OUT_SECOND_OF_DAY 1110
            MOVE GEOGRAPHIC_ID      1010    to GEOGRAPHIC_ID              1210
            MOVE VIDEO_SERVER_ID     1020    to VIDEO_SERVER_ID            1220
            MOVE VIDEO_CONTENT_ID    1030    to VIDEO_CONTENT_ID           1230
            MOVE DEMOGRAPHIC_ID      1070    to DEMOGRAPHIC_ID             1240
            MOVE SUB                         to SECOND_OF_DAY_WHEN_TUNED 1250
            MOVE 1                           to COUNT_OF_1                 1260
        WRITE Video Viewing Detal File 150
End Loop
```

Note:

The following fields were optionally included in Video Viewing Activity Data File 130 for data validation purposes. During Data Explosion Process 140 they are dropped so that they do not pass forward to Video Viewing Detail File 150.

| | |
|---|---|
| VIDEO_ASSET VIEWING_DEVICE_ID | 1040 |
| HOUSE_ID | 1050 |
| VIEWER_ID | 1060 |
| TUNE_IN_DATE_TIME | 1080 |
| TUNE_OUT_DATE_TIME | 1100 |
| TUNE_DURATION_SECONDS | 1120. |

The explosion process can be run in several ways to achieve the same result. I have included two alternative embodiments.

```
Alternative Embodiment #1
For each input record in Video Viewing Activity Data File 130
  PERFORM VARYING SUB
    FROM TUNE_IN_SECOND_OF_DAY 1090
    BY 1
    UNTIL SUB > (TUNE_IN_SECOND_OF_DAY   1090 +
              TUNE_DURATION_SECONDS      1120)
      MOVE GEOGRAPHIC_ID          1010    to GEOGRAPHIC_ID          1210
      MOVE VIDEO_SERVER_ID        1020    to VIDEO_SERVER_ID        1220
      MOVE VIDEO_CONTENT_ID       1030    to VIDEO_CONTENT_ID       1230
      MOVE DEMOGRAPHIC_ID         1070    to DEMOGRAPHIC_ID         1240
      MOVE SUB                            to SECOND_OF_DAY_WHEN_TUNED 1250
      MOVE 1                              to COUNT_OF_1             1260
      WRITE Video Viewing Detal File 150
End Loop
```

Alternative Embodiment #2

If the tune duration is provided, the looping construct can be done as follows:

```
For each input record in Video Viewing Activity Data File 130
  PERFORM VARYING SUB
    FROM TUNE_IN_DATE_TIME 1080
    BY 1
    UNTIL SUB > TUNE_OUT_DATE_TIME 1100
      MOVE GEOGRAPHIC_ID      1010    to GEOGRAPHIC_ID          1210
      MOVE VIDEO_SERVER_ID    1020    to VIDEO_SERVER_ID        1220
      MOVE VIDEO_CONTENT_ID   1030    to VIDEO_CONTENT_ID       1230
      MOVE DEMOGRAPHIC_ID     1070    to DEMOGRAPHIC_ID         1240
      MOVE SUB                        to SECOND_OF_DAY_WHEN_TUNED 1250
      MOVE 1                          to COUNT_OF_1             1260
      WRITE Video Viewing Detail File 150
End Loop
```

Note: In this case, the SECOND_OF_DAY_WHEN_TUNED 1250 will represent a UNIX EPOCH time stamp.

Note: In each case the Video Viewing Detail File 150 records can be written directly to the Hadoop Distributed File System (HDFS) so that the video viewing detail records are ready for use by the MapReduce distributed computing framework.

Note: The Video Viewing Activity Data File 130 can be provided by the Extract 120 process in any computer readable format including, but not limited to, database tables, flat files, JSON messages, and XML messages. Alternatively, such video viewing events can be collected directly from the source without the need for a Media Measurement Database 100. In such a case, those events can still be provided as video viewing activity in a format similar to that shown in FIG. 3 for use by the Data Explosion Process 140.

For all of the above embodiments, at the completion of Data Explosion Process 140, one record has been written to the Video Viewing Detail File 150 for each second of the tune duration represented in the video viewing activity record. The Sample Data in FIG. 3 shows a non-limiting example of the input data for the Data Explosion Process 140. The Sample Data in FIG. 4 shows a non-limiting example of the data produced by the Data Explosion Process 140. The reader will note that FIG. 4 sample data contains one record for every second of the tuning activity represented in the input data.

Those skilled in the art will readily recognize that the Data Explosion Process 140 is suitable for running in parallel on multiple computers simultaneously with each process creating Video Viewing Detail File records that can be fed into the MapReduce Aggregation Engine 200.

Proceeding with the review of FIG. 2, the Video Viewing Detail File 150 data residing in HDFS is now ready for use by the MapReduce Aggregation Engine 200. The MapReduce Aggregation Engine 200 runs various word count algorithms against the incoming data. Each word count algorithm will aggregate the data to a separate level as shown in FIG. 2 (Parts 220, 230, 240, 250) with the details shown in FIGS. 5-8.

The MapReduce process can be coded in JAVA or in Pig. I have coded this in Pig. The code below can be used to create the four output files reviewed in the Drawings (FIGS. 5 to 8):

I. Aggregated Video Viewing Geo+Server+Content+Demo File 220

II. Aggregated Video Viewing Geo+Server+Content File 230

III. Aggregated Video Viewing Content File 240

IV. Aggregated Video Viewing File 250.

Using these four outputs, the reader will have a comprehensive set of aggregated video viewing metrics. The reader should recognize that the aggregation logic shown below provides several illustrations of what can be done. Additional aggregation combinations will be obvious to those skilled in the art.

The reader will note that I have used very descriptive names in the Pig Latin code below so as to convey the meaning of what is happening. Much shorter names could be used to produce the same result.

Creating the Aggregated Video Viewing Geo+Server+Content+Demo File 220

The Pig Latin coding to create the Aggregated Video Viewing Geo+Server+Content+Demo File 220 is shown next.

This summarization aggregates viewing activity for each combination of geographic identifier and server identifier and content identifier and demographic identifier for each second of the aggregation period. The result provides viewing metrics for each combination of geographic area and video server and content and demographic identifier as represented in the input data. As a nonlimiting example, a Video Content Identifier may be a channel call sign; this summary then provides a count of how many devices were tuned to that channel within each geographic area (a city or a region) and within each video server and for each demographic group. As an example, how many devices in the DENV Geo area served by SERVER-01 were tuned to ABC from Demo code 40-60k during each second of the time period. A second example, how many devices in the DENV Geo area served by SERVER-01 were tuned to Program Monday Night Football from Demo code 40-60k during cach second of the time period.

```
Video_Viewing_Detail_Data = LOAD 'Video-Viewing-Detail-File' 150 as
      (GEOGRAPHIC_ID:chararray,                        1210
       VIDEO_SERVER_ID:chararray,                      1220
       VIDEO_CONTENT_ID:chararray,                     1230
       DEMOGRAPHIC_ID:chararray,                       1240
Video_Viewing_Detail_Data = LOAD 'Video-Viewing-Detail-File' 150 as
      (GEOGRAPHIC_ID:chararray.                        1210
       VIDEO_SERVER_ID:chararray,                      1220
       VIDEO_CONTENT_ID:chararray,                     1230
       DEMOGRAPHIC_ID:chararray,                       1240
       SECOND_OF_DAY_WHEN_TUNED:chararray,       1250
       COUNT_OF_1:chararray);                          1260
Aggregated_Video_Geo_Server_Content_Demo_Viewing    =
      GROUP Video_Viewing_Detail_Data
            by (GEOGRAPHIC_ID,               1410
                VIDEO_SERVER_ID,             1420
                VIDEO_CONTENT_ID,            1430
                DEMOGRAPHIC_ID,              1440
                SECOND_OF_DAY_WHEN_TUNED);   1450
Count_of_Aggregated_Video_Geo_Server_Content_Demo_Viewing_by_Second =
      FOREACH Aggregated_Video_Geo_Server_Content_Demo_Viewing
         GENERATE group
            as Aggregated_Video_Geo_Server_Content_Demo_Viewing,
                COUNT (Video_Viewing_Detail_Data)
                    as AggrGeoServerContentDemoViewingThisSecond;
STORE
   Count_of_Aggregated_Video_Geo_Server_Content_Demo_Viewing_by_Second
1460
      INTO 'Aggregated_Video_Viewing_Geo_Server_Content_Demo_File';  220
```

Note:
A sample of the file created by the aggregation is shown in FIG. 5 Sample Data.

Creating the Aggregated Video Viewing Geo+Server+Content File 230

The Pig Latin coding to create the Aggregated Video Viewing Geo+Server+Content File 230 is shown next.

This summarization aggregates viewing activity for cach combination of geographic identifier and server identifier and content identifier for each second of the aggregation period. The result provides viewing metrics for each combination of geographic area and video server and content id as represented in the input data. As a nonlimiting example, a Video Content Identifier may be a channel call sign; this summary then provides a count of how many devices were tuned to that channel within each geographic area (a city or a region) and within each video server. As an example, how many devices in the DENV Geo area served by SERVER-01 were tuned to ABC during each second of the time period.

```
Video_Viewing_Detail_Data = LOAD 'Video-Viewing-Detail-File' 150 as
      (GEOGRAPHIC_ID:chararray,                        1210
       VIDEO_SERVER_ID:chararray,                      1220
       VIDEO_CONTENT_ID:chararray,                     1230
       DEMOGRAPHIC_ID:chararray,                       1240
```

-continued

```
    SECOND_OF_DAY_WHEN_TUNED:chararray,      1250
    COUNT_OF_1:chararray);                   1260
Video_Viewing_Geo_Server_Content_Data =
    FOREACH Video_Viewing_Detail_Data
        GENERATE GEOGRAPHIC_ID,              1210
            VIDEO_SERVER_ID,                 1220
            VIDEO_CONTENT_ID,                1230
            SECOND_OF_DAY_WHEN_TUNED,        1250
            COUNT_OF_1;                      1260
Aggregated_Video_Geo_Server_Content_Viewing   =
    GROUP Video_Viewing_Geo_Server_Content_Data
        by (GEOGRAPHIC_ID,                   1610
            VIDEO_SERVER_ID,                 1620
            VIDEO_CONTENT_ID,                1630
            SECOND_OF_DAY_WHEN_TUNED); 1650
Count_of_Aggregated_Video_Geo_Server_Content_Viewing_by_Second =
    FOREACH Aggregated_Video_Geo_Server_Content_Viewing
        GENERATE group as Aggregated_Video_Geo_Server_Content_Viewing,
            COUNT(Video_Viewing_Geo_Server_Content_Data)
                as AggrGeoServerContentViewingThisSecond;
STORE Count_of_Aggregated_Video_Geo_Server_Content_Viewing_by_Second
1660
    INTO 'Aggregated_Video_Viewing_Geo_Server_Content_File';   230
```

Note:
A sample of the file created by the aggregation is shown in FIG. 6 Sample Data.

Creating the Aggregated Video Viewing Content File 240

The Pig Latin coding to create the Aggregated Video Viewing Content File 240 is shown next. This summarization aggregates viewing across all geographic identifiers, all servers, and all demographic groups for each second of the aggregation period. The result provides viewing metrics for the content (channel) across all geographic areas, video servers, and demographic groups as represented in the input data. As a nonlimiting example, a Video Content Identifier may be a channel call sign; this summary then provides a count of how many devices were tuned to that channel during each second of the viewing period.

Creating the Aggregated Video Viewing File 250

The Pig Latin coding to create the Aggregated Video Viewing File 250 is shown next. This summarization aggregates viewing activity across all geographic identifiers, all servers, all content, and all demographic groups for each second of the aggregation period. The result provides viewing metrics across all geographic areas, video servers, content ids, and demographic groups as represented in the input data. As a nonlimiting example, this aggregation will provide insight into total viewing activity during each second of the measurement period. This is creating the denominator which can be used in calculations which measure the percentage of the total viewing audience that a particular piece of content earned.

```
Video_Viewing_Detail_Data = LOAD 'Video-Viewing-Detail-File' 150 as
    (GEOGRAPHIC_ID:chararray,                1210
        VIDEO_SERVER_ID:chararray,           1220
        VIDEO_CONTENT_ID:chararray,          1230
        DEMOGRAPHIC_ID:chararray,            1240
        SECOND_OF_DAY_WHEN_TUNED:chararray,  1250
        COUNT_OF_1; chararray);              1260
Video_Viewing_Content_Data =
    FOREACH Video_Viewing_Detail_Data
        GENERATE VIDEO_CONTENT_ID,           1230
            SECOND_OF_DAY_WHEN_TUNED,        1250
            COUNT_OF_1;                      1260
Aggregated_Video_Content_Viewing =
    GROUP Video_Viewing_Content_Data
        by (VIDEO_CONTENT_ID,                1830
            SECOND_OF_DAY_WHEN_TUNED);   1850
Count_of_Aggregated_Video_Content_Viewing_by_Second =
    FOREACH Aggregated_Video_Content_Viewing
        GENERATE group as Aggregated_Video_Content_Viewing,
            COUNT (Video_Viewing_Content_Data)
                as AggrContentViewingThisSecond;
    STORE Count_of_Aggregated_Video_Content_Viewing_by_Second 1860
        INTO 'Aggregated_Video_Viewing_Content_File';   240
```

Note:
A sample of the file created by the aggregation is shown in FIG. 7 Sample Data.

```
Video_Viewing_Detail_Data = LOAD 'Video-Viewing-Detail-File' 150 as
   (GEOGRAPHIC_ID:chararray,                         1210
      VIDEO_SERVER_ID:chararray,                     1220
      VIDEO_CONTENT_ID:chararray,                    1230
      DEMOGRAPHIC_ID:chararray,                      1240
      SECOND_OF_DAY_WHEN_TUNED:chararray,            1250
      COUNT_OF_1:chararray);                         1260
Video_Viewing_Data =
   FOREACH Video_Viewing_Detail_Data
      GENERATE SECOND_OF_DAY_WHEN_TUNED,      1260
         COUNT_OF_1;                          1250
Aggregated_Video_Viewing  =
   GROUP Video_Viewing_Data_by_SECOND_OF_DAY_WHEN_TUNED;   2050
Count_of_Aggregated_Video_Viewing_by_Second =
   FOREACH Aggregated_Video_Viewing
      GENERATE group as Aggregated_Video_Viewing,
         COUNT (Video_Viewing_Data) as AggrViewingThisSecond;
STORE Count_of_Aggregated_Video_Viewing_by_Second 2060
   INTO 'Aggregated_Video_Viewing_File';   250
```

Note:
A sample of the file created by the aggregation is shown in FIG. 8 Sample Data.

FIG. 3 illustrates an exemplary record layout for a Video Viewing Activity Data File 130 record formatted for use as input to the Data Explosion Process 140, according to one embodiment.

There is Summary Information followed by the Data Structure including field definitions. After the Data Structure there is a set of Sample Data.

FIG. 4 illustrates an exemplary record layout for a Video Viewing Detail File 150 record which is output from the Data Explosion Process 140, according to one embodiment. This file is then ready for input to the MapReduce Aggregation Engine 200.

There is Summary Information followed by the Data Structure including field definitions. After the Data Structure there is a set of Sample Data.

Overview of FIGS. 5 to 8

FIGS. 5 to 8 review several outputs which are created by the MapReduce Aggregation Engine 200. There are multiple ways to aggregate the data depending upon the desired result. In FIGS. 5 to 8 I have shown several options. A person skilled in the art will readily identify additional aggregations options that fall within the spirit and scope of this Application.

FIG. 5 illustrates an exemplary record layout for a Aggregated Video Viewing Geo+Server+Content+Demo File 220 record which is output from the MapReduce Aggregation Engine 200, according to one embodiment. This file is ready for input to downstream analytics processes.

There is Summary Information followed by the Data Structure including field definitions. After the Data Structure there is a set of Sample Data.

FIG. 6 Illustrates an exemplary record layout for a Aggregated Video Viewing Geo+Server+Content File 230 record which is output from the MapReduce Aggregation Engine 200, according to one embodiment. This file is ready for input to downstream analytics processes.

There is Summary Information followed by the Data Structure including field definitions. After the Data Structure there is a set of Sample Data.

FIG. 7 Illustrates an exemplary record layout for a Aggregated Video Viewing Content File 240 record which is output from the MapReduce Aggregation Engine 200, according to one embodiment. This file is ready for input to downstream analytics processes.

There is Summary Information followed by the Data Structure including field definitions. After the Data Structure there is a set of Sample Data.

FIG. 8 Illustrates an exemplary record layout for a Aggregated Video Viewing File 250 record which is output from the MapReduce Aggregation Engine 200, according to one embodiment. This file is ready for input to downstream analytics processes.

There is Summary Information followed by the Data Structure including field definitions. After the Data Structure there is a set of Sample Data.

Alternative Embodiments

Although the description above contains much specificity, this should not be construed as limiting the scope of the embodiments but as merely providing illustrations of some of several embodiments. As a nonlimiting example, additional qualifiers may be added along with geographic identifiers, video server identifiers, video content identifiers, and demographic identifiers. Additional aggregations can be done using other combinations of these identifiers.

Scope of Viewer Interaction Data Loaded

I presently contemplate that the MapReduce Aggregation Engine 200 will process viewer interaction data for whatever set of viewing activity is provided to it. This may be one Video Program at a time, one hour of the day, a primetime television viewing period, an entire 24 hour day of viewing, a week of viewing, or another time period decided by the analyst. Another embodiment may simply process viewing activity within the context of a single program, or a single advertisement, or some other combination.

Identifiers for Data

I presently contemplate using a combination of numeric and mnemonics for the various identifiers such as geographic identifiers, video server identifiers, video content identifiers, and demographic identifiers, and other similar fields, but another embodiment could use only numeric values as identifiers with links to reference tables for the descriptions of the numeric identifiers or only mnemonic identifiers.

Data Explosion Process

I presently contemplate that the Data Explosion Process 140 will generate one record for each second of the tuning activity. Another embodiment may generate one record for each video frame of viewing activity. In this case, the second of the day for tune-in and tune-out would be replaced by a frame number of the tune-in and a frame number of the tune-out.

Yet another embodiment may generate records at a one minute level with the count being the number of seconds tuned to the content during that minute (in this case there would be 1,440 possible one minute intervals during a 24 hour day).

Yet another embodiment may generate records at a 10-second level with the count being the number of seconds tuned to the content during that 10-second interval (in this case there would be 8,640 possible 10-second intervals during a 24 hour day).

Programming Algorithm Scope

I presently contemplate executing the algorithms described herein separately in some sequence, but another embodiment could combine multiple simple algorithms into fewer complex algorithms.

Receiving Date and Time Information

I presently contemplate that the various file formats which provide date and time information will provide an actual date and time whether represented in a format such as YYYY-MM-DD HH:MM:SS AM/PM, or Epoch time (seconds since Jan. 1, 1970). Another embodiment may provide the tune-in and tune-out times as seconds relative to the true beginning of the program content. Any of these embodiments can be used as input to create the metrics.

I presently contemplate receiving all of the date and time values in local time, but another embodiment may provide these in Coordinated Universal Time (UTC time).

General Information

I presently contemplate using variables having the data types and field sizes shown, but another embodiment may use variables with different data types and field sizes to accomplish a similar result.

I presently contemplate tracking viewing activity at the granularity of one second, but another embodiment may track viewing activity at a finer granularity, perhaps half-second, or tenth-second, or millisecond. Yet another embodiment may receive data at a granularity finer than one second and round to the nearest second for use by the MapReduce Aggregation Engine 200.

I presently contemplate using record layouts similar to those defined herein, but another embodiment may use a different record layout or record layouts to accomplish a similar result. As a non-limiting example, another embodiment may use database tables or other objects instead of record layouts similar to those I have defined herein to accomplish a similar result while still working within the spirit and scope of this disclosure.

Implementation Information

I presently contemplate using the generic Apache Hadoop distribution, but another embodiment may use a different Hadoop distribution.

I presently contemplate using Linux operating system, but another embodiment may use a different operating system.

I presently contemplate using the Pig along with the Pig Latin dataflow language, but another embodiment may use Java or Python or some other language alone or in combination with Pig Latin.

GENERAL REMARKS

It will be apparent to those of ordinary skill in the art that various changes and modifications may be made which clearly fall within the scope of the embodiments revealed herein. In describing an embodiment illustrated in the drawings, specific terminology has been used for the sake of clarity. However, the embodiments are not intended to be limited to the specific terms so selected, and it is to be understood that each specific term includes all technical equivalents which operate in a similar manner to accomplish a similar purpose.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present embodiment. For example, the embodiments described hereinabove may be implemented in computer software using any suitable computer software language type such as, for example, Python of JAVA using, for example, conventional or object-oriented techniques. Such software may be stored on any type of suitable computer-readable medium or media such as, for example, a magnetic or optical storage medium. Thus, the operation and behavior of the embodiments are described in Pig Latin dataflow language purely as a matter of convenience. It is clearly understood that artisans of ordinary skill would be able to design software and control hardware to implement the embodiments presented in the language of their choice based on the description herein with only a reasonable effort and without undue experimentation.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, a compact disk, an optical disk, magnetic tape, or magnetic disk. Furthermore, some of the processes may be programmed when the computer system is manufactured or via a computer-readable medium.

It can also be appreciated that certain process aspects disclosed herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, memory sticks, and hard disk drives. A computer-readable medium may also include memory storage that may be physical, virtual, permanent, temporary, semi-permanent and/or semi-temporary.

In various embodiments disclosed herein, a single component or algorithm may be replaced by multiple components or algorithms, and multiple components or algorithms may be replaced by a single component or algorithm, to perform a given function or functions. Except where such substitution would not be operative to implement the embodiments disclosed herein, such substitution is within the scope presented herein. Thus any element expressed herein as a means or a method for performing a specified function is intended to encompass any way of performing that function including, for example, a combination of elements that performs that function. Therefore, any means or method that can provide such functionalities may be considered equivalents to the means or methods shown herein.

It can be appreciated that the "data analysis computer system" may be, for example, any computer system capable of running MapReduce, whether it be a one node system or a system with thousands of nodes.

While various embodiments have been described herein, it should be apparent, however, that various modifications, alterations and adaptations to those embodiments may occur to persons skilled in the art with the attainment of some or all of the advantages described herein. The disclosed embodiments are therefore intended to include all such modifications, alterations and adaptations without departing from the scope and spirit of the embodiments presented herein as set forth in the appended claims.

Accordingly, the scope should be determined not by the embodiments illustrated, but by the appended claims and their legal equivalents.

CONCLUSIONS, RAMIFICATIONS, AND SCOPE

In my previous Applications, I have identified numerous Conclusions, Ramifications, and Scope items. Many of those are similar for this application. The Conclusions, Ramifications, and Scope items from my U.S. Pat. No. 8,365,212 B1 issued on Jan. 29, 2013, and my U.S. Pat. No. 8,365,213 B1 issued on Jan. 29, 2013, and my U.S. application Ser. No. 13/360,704 filed on Jan. 28, 2012, and my U.S. application Ser. No. 13/567,073 filed on Aug. 5, 2012 and my U.S. application Ser. No. 13/740,199 filed on Jan. 13, 2013 are included herein by reference but not admitted to be prior art.

In this discussion below, I will focus on new ramifications introduced by this Application.

From the description above, a number of advantages of some embodiments of my MapReduce Aggregation Engine 200 and its supporting processes become evident:

In this specification I have taught how to measure or analyze video viewing activity at a second-by-second level using the Hadoop MapReduce framework. Within this context, I have taught how to measure such viewing activity within multiple levels: (a) a geographic area, (b) a video server, (c) a video content identifier, and (d) a demographic grouping. Additionally, I have taught how to measure viewing across all of these to provide denominators for calculating percentage of viewing audience. All of these metrics can be calculated at a second-by-second level for each second of the video content.

Once the metrics are calculated, the resulting files can be loaded to a database for longitudinal analysis. As a nonlimiting example, the program level metrics can be tracked to identify week-to-week activity. Then the more detailed metrics can provide additional insight into the causes behind the overall trends.

The ability to produce these metrics using the Hadoop MapReduce framework provides a new tool for data analysts to use in understanding viewing behavior.

This method of using the Hadoop MapReduce framework to calculate second-by-second viewing activity by aggregating individual viewing records that were created by exploding the viewing period into individual records where each record represents one second of viewing activity is contrary to the teaching of those who work with start time and duration (seconds viewed). Thus I am able to solve problems previously found insolvable when limited to using the existing techniques. I am able to provide metrics that could not be produced using existing techniques.

Subsequent Usage of the Metrics

The metrics produced by the MapReduce Aggregation Engine 200 readily lend themselves to dimensional analysis using contemporary data warehouse methods. I have reviewed this extensively in my prior applications.

The metrics produced by the MapReduce Aggregation Engine 200 can be loaded to a data warehouse to support additional longitudinal analysis beyond what is done by the Engine 200. Thus we can readily envision a myriad of uses for the metrics produced by the MapReduce Aggregation Engine 200.

Numerous additional metrics can readily be identified by those skilled in the art. Additionally, numerous additional uses for the metrics identified herein will be readily evident to those skilled in the art.

SUMMARY

In accordance with one embodiment, I have disclosed a computer-implemented method of using video viewing activity data as input to an aggregation engine built on the Hadoop MapReduce distributed computing framework for parallel processing which calculates second-by-second video viewing activity aggregated to the analyst's choice of (a) geographic area, (b) video server, (c) video content (channel call sign, video program, etc.), or (d) viewer demographic, or any combination of these fields, for each second of the day represented in the video viewing activity data. The engine also calculates overall viewing for use as a denominator in calculations. The source data may be extracted from a database defined according to the Cable Television Laboratories, Inc. Media Measurement Data Model defined in "Audience Data Measurement Specification" as "OpenCable™ Specifications, Audience Measurement, Audience Measurement Data Specification" document OC-SP-AMD-101-130502 or any similar format. These metrics provide detailed data needed to calculate information on customer viewing behavior that can drive business decisions for service providers, advertisers, and content producers. The ability to use the Hadoop MapReduce framework to aggregate this data will meet pressing needs for detailed audience viewership information that is not presently available and thus the metrics will be of great value to the industry.

What is claimed:

1. A method comprising:

determining, by a computing device, based on data indicating a plurality of video-viewing events, and for each interval of a plurality of intervals of a video asset, an amount of time during which a video-asset-viewing device output the video asset; and incrementing, by the computing device and based on the amount of time determined for a first interval of the plurality of intervals of the video asset, a content viewing count associated with the first interval of the video asset.

2. The method of claim 1, further comprising:

receiving, by the computing device, the data indicating the plurality of video-viewing events, wherein each video-viewing event of the plurality of video-viewing events is associated with one or more intervals of the plurality of intervals of the video asset.

3. The method of claim 1, wherein the determining the amount of time comprises determining a number of predefined increments of time, of the each interval, during which the video-asset-viewing device output the video asset.

4. The method of claim 1, wherein the determining the amount of time comprises determining a number of frames of the video asset that the video-asset-viewing device output during the each interval.

5. The method of claim 1, further comprising:

receiving data indicating a second plurality of video-viewing events, wherein each video-viewing event of the second plurality of video-viewing events is associated with one or more intervals, of the plurality of intervals of the video asset, during which a second video-asset-viewing device output the video asset; and determining, based on the second plurality of video-viewing events and for each interval of the plurality of intervals of the video asset, an amount of time during which the second video-asset-viewing device output the video asset.

6. The method of claim 1, wherein the amount of time determined for the first interval of the plurality of intervals of the video asset comprises a count of a number of seconds, of the first interval, during which the video-asset-viewing device output the video asset.

7. The method of claim 1, wherein the incrementing the content viewing count is based on determining that the video-asset-viewing device is associated with at least one of: a geographic attribute, a content source attribute, or a viewer demographic attribute.

8. The method of claim 1, further comprising:

based on adding the content viewing count and one or more content viewing counts associated with one or more second intervals of the plurality of intervals of the video asset, determining a total viewing count; and determining a ratio between the content viewing count and the total viewing count.

9. A method comprising:

determining, by a computing device and based on data indicating a plurality of video-viewing events, an amount of time, of an interval of a plurality of intervals of a video asset, during which a video-asset-viewing device, of a plurality of video-asset-viewing devices, output the video asset; and incrementing, by the computing device and based on the amount of time, a content viewing count, associated with the plurality of video-asset-viewing devices outputting the video asset during the interval.

10. The method of claim 9, further comprising:

receiving, by the computing device, data indicating the plurality of video-viewing events, wherein each video-viewing event of the plurality of video-viewing events is associated with one or more intervals of the plurality of intervals of a video asset.

11. The method of claim 9, wherein the determining the amount of time comprises determining a number of predefined increments of time, of the interval, during which the video-asset-viewing device output the video asset.

12. The method of claim 9, wherein the determining the amount of time comprises determining a number of frames of the video asset that the video-asset-viewing device output during the interval.

13. The method of claim 9, wherein the plurality of intervals of the video asset comprises a plurality of equally sized intervals of the video asset.

14. The method of claim 9, wherein the amount of time is less than the interval of the plurality of intervals of the video asset.

15. An apparatus comprising:

one or more processors; and memory storing instructions that, when executed by the one or more processors, cause the apparatus to:

determine, based on data indicating a plurality of video-viewing events and for each interval of a plurality of intervals of a video asset, an amount of time during which a video-asset-viewing device output the video asset; and increment, based on the amount of time determined for a first interval of the plurality of intervals of the video asset, a content viewing count associated with the first interval of the video asset.

16. The apparatus of claim 15, wherein the instructions, when executed by the one or more processors, further cause the apparatus to:

receive the data indicating the plurality of video-viewing events, wherein each video-viewing event of the plurality of video-viewing events is associated with one or more intervals of the plurality of intervals of the video asset.

17. The apparatus of claim 15, wherein the instructions, when executed by the one or more processors, further cause the apparatus to determine the amount of time by causing:

determining a number of predefined increments of time, of the each interval, during which the video-asset-viewing device output the video asset.

18. The apparatus of claim 15, wherein the instructions, when executed by the one or more processors, further cause the apparatus to determine the amount of time by causing:

determining a number of frames of the video asset that the video-asset-viewing device output during the each interval.

19. The apparatus of claim 15, wherein the instructions, when executed by the one or more processors, further cause the apparatus to:

receive data indicating a second plurality of video-viewing events, wherein each video-viewing event of the second plurality of video-viewing events is associated with one or more intervals, of the plurality of intervals of the video asset, during which a second video-asset-viewing device output the video asset; and determine, based on the second plurality of video-viewing events and for each interval of the plurality of intervals of the video asset, an amount of time during which the second video-asset-viewing device output the video asset.

20. The apparatus of claim 15, wherein the amount of time determined for the first interval of the plurality of intervals of the video asset comprises a count of a number of seconds, of the first interval, during which the video-asset-viewing device output the video asset.

21. The apparatus of claim 15, wherein the instructions, when executed by the one or more processors, further cause the apparatus to:

based on adding the content viewing count and one or more content viewing counts associated with one or more second intervals of the plurality of intervals of the video asset, determine a total viewing count; and determine a ratio between the content viewing count and the total viewing count.

22. An apparatus comprising:

one or more processors; and memory storing instructions that, when executed by the one or more processors, cause the apparatus to:

determine, based on data indicating a plurality of video-viewing events, an amount of time, of an interval of a plurality of intervals of a video asset, during which a video-asset-viewing device, of a plurality of video-asset-viewing devices, output the video asset; and increment, based on the amount of time, a content viewing count, associated with the plurality of video-asset-viewing devices outputting the video asset during the interval.

23. The apparatus of claim 22, wherein the instructions, when executed by the one or more processors, further cause the apparatus to:

receive data indicating the plurality of video-viewing events, wherein each video-viewing event of the plurality of video-viewing events is associated with one or more intervals of the plurality of intervals of a video asset.

24. The apparatus of claim 22, wherein the instructions, when executed by the one or more processors, further cause the apparatus to determine the amount of time by causing: determining a number of predefined increments of time, of the interval, during which the video-asset-viewing device output the video asset.

25. The apparatus of claim 22, wherein the instructions, when executed by the one or more processors, further cause the apparatus to determine the amount of time by causing: determining a number of frames of the video asset that the video-asset-viewing device output during the interval.

26. The apparatus of claim 22, wherein the plurality of intervals of the video asset comprises a plurality of equally sized intervals of the video asset.

27. The apparatus of claim 22, wherein the amount of time is less than the interval of the plurality of intervals of the video asset.

28. One or more non-transitory computer readable media storing instructions that, when executed, cause: determining, based on data indicating a plurality of video-viewing events, and for each interval of a plurality of intervals of a video asset, an amount of time during which a video-asset-viewing device output the video asset; and incrementing, based on the amount of time determined for a first interval of the plurality of intervals of the video asset, a content viewing count associated with the first interval of the video asset.

29. The one or more non-transitory computer readable media of claim 28, wherein the instructions, when executed, further cause: receiving the data indicating the plurality of video-viewing events, wherein each video-viewing event of the plurality of video-viewing events is associated with one or more intervals of the plurality of intervals of the video asset.

30. The one or more non-transitory computer readable media of claim 28, wherein the instructions, when executed, further cause the determining the amount of time by causing: determining a number of predefined increments of time, of the each interval, during which the video-asset-viewing device output the video asset.

31. The one or more non-transitory computer readable media of claim 28, wherein the instructions, when executed, further cause the determining the amount of time by causing: determining a number of frames of the video asset that the video-asset-viewing device output during the each interval.

32. The one or more non-transitory computer readable media of claim 28, wherein the instructions, when executed, further cause: receiving data indicating a second plurality of video-viewing events, wherein each video-viewing event of the second plurality of video-viewing events is associated with one or more intervals, of the plurality of intervals of the video asset, during which a second video-asset-viewing device output the video asset; and determining, based on the second plurality of video-viewing events and for each interval of the plurality of intervals of the video asset, an amount of time during which the second video-asset-viewing device output the video asset.

33. The one or more non-transitory computer readable media of claim 28, wherein the amount of time determined for the first interval of the plurality of intervals of the video asset comprises a count of a number of seconds, of the first interval, during which the video-asset-viewing device output the video asset.

34. The one or more non-transitory computer readable media of claim 28, wherein the incrementing the content viewing count is based on determining that the video-asset-viewing device is associated with at least one of: a geographic attribute, a content source attribute, or a viewer demographic attribute.

35. The one or more non-transitory computer readable media of claim 28, wherein the instructions, when executed, further cause: based on adding the content viewing count and one or more content viewing counts associated with one or more second intervals of the plurality of intervals of the video asset, determining a total viewing count; and determining a ratio between the content viewing count and the total viewing count.

36. One or more non-transitory computer readable media storing instructions that, when executed, cause: determining, based on data indicating a plurality of video-viewing events, an amount of time, of an interval of a plurality of intervals of a video asset, during which a video-asset-viewing device, of a plurality of video-asset-viewing devices, output the video asset; and incrementing, based on the amount of time, a content viewing count, associated with the plurality of video-asset-viewing devices outputting the video asset during the interval.

37. The one or more non-transitory computer readable media of claim 36, wherein the instructions, when executed, further cause: receiving data indicating the plurality of video-viewing events, wherein each video-viewing event of the plurality of video-viewing events is associated with one or more intervals of the plurality of intervals of a video asset.

38. The one or more non-transitory computer readable media of claim 36, wherein the instructions, when executed, further cause the determining the amount of time by causing: determining a number of predefined increments of time, of the interval, during which the video-asset-viewing device output the video asset.

39. The one or more non-transitory computer readable media of claim 36, wherein the instructions, when executed, further cause the determining the amount of time by causing: determining a number of frames of the video asset that the video-asset-viewing device output during the interval.

40. The one or more non-transitory computer readable media of claim 36, wherein the plurality of intervals of the video asset comprises a plurality of equally sized intervals of the video asset.

41. The one or more non-transitory computer readable media of claim 36, wherein the amount of time is less than the interval of the plurality of intervals of the video asset.

* * * * *